(12) United States Patent
Yoskowitz et al.

(10) Patent No.: US 11,354,438 B1
(45) Date of Patent: *Jun. 7, 2022

(54) PHONE NUMBER ALIAS GENERATION

(71) Applicant: JOINESTY, INC., Chicago, IL (US)

(72) Inventors: Robert Jeffrey Yoskowitz, Chicago, IL (US); Stephen Michael Yoskowitz, Chicago, IL (US); Elder Donizetti Dos Santos, Sao Jose dos Campos (BR); José Carlos De Souza Bueno, Jr., São José dos Campos (BR)

(73) Assignee: JOINESTY, INC., Chicago, IL (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/773,668

(22) Filed: Jan. 27, 2020

Related U.S. Application Data

(60) Provisional application No. 62/906,495, filed on Sep. 26, 2019.

(51) Int. Cl.
*H04L 29/06* (2006.01)
*G06F 21/62* (2013.01)
(Continued)

(52) U.S. Cl.
CPC ...... *G06F 21/6254* (2013.01); *H04L 63/0471* (2013.01); *H04L 63/083* (2013.01);
(Continued)

(58) Field of Classification Search
CPC ............. G06F 21/6254; H04L 63/0471; H04L 63/083; H04L 63/101; H04M 3/42008;
(Continued)

(56) References Cited

U.S. PATENT DOCUMENTS 5,327,534 A 7/1994 Hutchison et al.
5,381,479 A 1/1995 Gardeck et al.
(Continued)

FOREIGN PATENT DOCUMENTS

GB 2540656 A 1/2017
WO WO-2002058357 A2 7/2002
(Continued)

OTHER PUBLICATIONS

Thomas et al., "Data Breaches, Phishing, or Malware?: Understanding the Risks of Stolen Credentials", CCS '17: Proceedings of the 2017 ACM SIGSAC Conference on Computer and Communications Security, October (Year: 2017).*
(Continued)

*Primary Examiner* — Morshed Mehedi
(74) *Attorney, Agent, or Firm* — Marshall, Gerstein & Borun LLP

(57) ABSTRACT

The disclosed systems and techniques enable an enterprise system to store contact phone numbers for users while avoiding storing and managing personal phone numbers for the user. For example, the enterprise system may forward personal phone numbers to an aliasing server configured to (i) generate alias phone numbers based on the personal email addresses and (ii) provide the alias phone numbers to the enterprise system. The aliasing server may operate as a "middle man" that receives phone calls or text messages directed to the alias phone numbers and that forwards the phone calls or text messages to the corresponding personal phone numbers (when appropriate). The enterprise system may store and maintain the alias phone numbers in lieu of storing the personal email addresses.

20 Claims, 12 Drawing Sheets

(51) Int. Cl.
*H04M 3/42* (2006.01)
*H04M 3/54* (2006.01)
*H04L 9/40* (2022.01)

(52) U.S. Cl.
CPC ...... *H04L 63/101* (2013.01); *H04M 3/42008* (2013.01); *H04M 3/42068* (2013.01); *H04M 3/42382* (2013.01); *H04M 3/541* (2013.01)

(58) Field of Classification Search
CPC ......... H04M 3/42068; H04M 3/42382; H04M 3/541
See application file for complete search history.

(56) References Cited

U.S. PATENT DOCUMENTS

| | | |
|---|---|---|
| 5,910,906 A | 6/1999 | Schmitt |
| 6,085,231 A | 7/2000 | Agraharam et al. |
| 6,115,394 A | 9/2000 | Balachandran et al. |
| 6,161,129 A | 12/2000 | Rochkind |
| 6,173,444 B1 | 1/2001 | Archambault |
| 7,310,772 B2 | 12/2007 | Whitfield |
| 7,406,469 B1 | 7/2008 | Thiyagarajan |
| 7,412,422 B2 | 8/2008 | Shiloh |
| 7,433,710 B2 | 10/2008 | Bodnar et al. |
| 7,747,746 B2 | 6/2010 | Thayer et al. |
| 7,865,613 B2 | 1/2011 | Lerner |
| 8,014,757 B1 | 9/2011 | Lim |
| 8,281,372 B1 | 10/2012 | Vidal |
| 8,316,233 B2 | 11/2012 | Errico |
| 8,374,628 B1 | 2/2013 | Nelissen et al. |
| 8,516,550 B2 | 8/2013 | Willars et al. |
| 8,566,902 B2 | 10/2013 | Draughon et al. |
| 8,644,847 B1 | 2/2014 | Nelissen et al. |
| 8,700,788 B2 | 4/2014 | Gailey et al. |
| 8,719,952 B1 | 5/2014 | Damm-Goossens |
| 8,738,475 B2 | 5/2014 | Keld |
| 9,270,818 B1 | 2/2016 | Nelissen et al. |
| 9,329,771 B2 | 5/2016 | Fadell et al. |
| 9,473,468 B2 | 10/2016 | Gupta |
| 9,607,041 B2 | 3/2017 | Himmelstein |
| 9,716,788 B2 | 7/2017 | Bendi et al. |
| 9,740,867 B2 | 8/2017 | Nelson et al. |
| 9,876,743 B1 | 1/2018 | Vippagunta |
| 9,934,396 B2 | 4/2018 | McReynolds et al. |
| 9,959,694 B2 | 5/2018 | Lindsay |
| 10,069,970 B1 * | 9/2018 | Drake ..................... H04M 3/02 |
| 10,148,659 B2 | 12/2018 | Nandakumar |
| 10,474,833 B2 | 11/2019 | Freedman et al. |
| 10,600,081 B2 | 3/2020 | Stafford, Jr. et al. |
| 10,614,456 B2 | 4/2020 | Mokhasi |
| 10,645,570 B1 | 5/2020 | Venkatachalam et al. |
| 10,657,061 B1 | 5/2020 | Marriner |
| 2002/0136370 A1 | 9/2002 | Gallant |
| 2002/0138743 A1 | 9/2002 | Murakami et al. |
| 2002/0178370 A1 | 11/2002 | Gurevich et al. |
| 2003/0028599 A1 | 2/2003 | Kolsky |
| 2004/0177120 A1 | 9/2004 | Kirsch |
| 2005/0010780 A1 | 1/2005 | Kane et al. |
| 2005/0198173 A1 | 9/2005 | Evans |
| 2006/0026438 A1 | 2/2006 | Stern et al. |
| 2006/0136561 A1 | 6/2006 | Lee |
| 2006/0143136 A1 | 6/2006 | Low et al. |
| 2007/0244977 A1 | 10/2007 | Atkins |
| 2007/0250704 A1 | 10/2007 | Hallam-Baker |
| 2008/0005341 A1 | 1/2008 | Subbian |
| 2008/0008105 A1 | 1/2008 | Black et al. |
| 2008/0045186 A1 | 2/2008 | Black et al. |
| 2008/0052364 A1 | 2/2008 | Zhou |
| 2008/0148366 A1 | 6/2008 | Wahl |
| 2009/0193507 A1 | 7/2009 | Ibrahim |
| 2009/0259725 A1 | 10/2009 | Rabinovich |
| 2010/0017598 A1 | 1/2010 | Rodriguez et al. |
| 2010/0037046 A1 | 2/2010 | Ferg et al. |
| 2011/0295988 A1 * | 12/2011 | Le Jouan ................ G06F 21/31 |
| | | 709/223 |
| 2012/0016938 A1 | 1/2012 | Gallant |
| 2012/0036360 A1 | 2/2012 | Bassu et al. |
| 2012/0109882 A1 | 5/2012 | Bouse et al. |
| 2012/0215862 A1 | 8/2012 | Cai et al. |
| 2012/0324020 A1 | 12/2012 | O'Sullivan et al. |
| 2013/0042110 A1 | 2/2013 | Shablygin et al. |
| 2013/0198811 A1 * | 8/2013 | Yu .......................... G06Q 50/01 |
| | | 726/4 |
| 2014/0164254 A1 | 6/2014 | Dimmick |
| 2014/0317708 A1 | 10/2014 | Adrangi et al. |
| 2014/0325623 A1 | 10/2014 | Johansson |
| 2014/0344907 A1 | 11/2014 | Wan et al. |
| 2014/0373106 A1 | 12/2014 | Morgenroth |
| 2015/0249540 A1 | 9/2015 | Khalil et al. |
| 2015/0288676 A1 | 10/2015 | Guo |
| 2015/0341327 A1 | 11/2015 | Barton et al. |
| 2016/0014119 A1 | 1/2016 | Inoue et al. |
| 2016/0119261 A1 | 4/2016 | Ghafourifar et al. |
| 2016/0142536 A1 | 5/2016 | Bendi et al. |
| 2016/0255040 A1 * | 9/2016 | Howe .................... H04L 51/12 |
| | | 709/206 |
| 2016/0283740 A1 | 9/2016 | Roundtree |
| 2016/0283920 A1 | 9/2016 | Fisher et al. |
| 2016/0300231 A1 | 10/2016 | Shavell et al. |
| 2016/0314460 A1 | 10/2016 | Subramanian et al. |
| 2017/0024581 A1 | 1/2017 | Grubel et al. |
| 2017/0111337 A1 | 4/2017 | Saboori et al. |
| 2017/0213200 A1 | 7/2017 | Purves |
| 2017/0237739 A1 | 8/2017 | Nandakumar |
| 2017/0270794 A1 * | 9/2017 | Sweeney ................ G08G 1/143 |
| 2018/0053182 A1 | 2/2018 | Mokhasi |
| 2019/0037071 A1 | 1/2019 | Singh et al. |
| 2019/0312837 A1 | 10/2019 | McIsaac et al. |
| 2019/0370487 A1 | 12/2019 | Veltman et al. |
| 2019/0372961 A1 * | 12/2019 | Circosta ................ H04L 9/0866 |
| 2019/0387025 A1 | 12/2019 | Gummaraju et al. |
| 2020/0007647 A1 | 1/2020 | Castagna et al. |
| 2020/0036682 A1 | 1/2020 | Honma et al. |
| 2020/0050795 A1 | 2/2020 | Solomon et al. |
| 2020/0090182 A1 | 3/2020 | Dimmick |
| 2020/0382455 A1 | 12/2020 | Fasoli et al. |
| 2020/0382495 A1 | 12/2020 | Belov et al. |
| 2020/0404009 A1 | 12/2020 | Shinomiya et al. |
| 2021/0021572 A1 | 1/2021 | Bonczar |
| 2021/0051015 A1 | 2/2021 | Widmann et al. |

FOREIGN PATENT DOCUMENTS

| | | | | |
|---|---|---|---|---|
| WO | WO-03050743 A1 * | 6/2003 | ......... | H04N 21/6131 |
| WO | 2005/048544 A1 | 5/2005 | | |
| WO | WO-2013163652 A2 * | 10/2013 | ......... | H04L 63/0421 |
| WO | 2014/150250 A2 | 9/2014 | | |
| WO | WO-2015000397 A1 | 1/2015 | | |

OTHER PUBLICATIONS

International Search Report and Written Opinion for PCT/US2017/026224, dated Jul. 10, 2017.
Tech Crunch, "Answers to your burning questions about how 'Sign in with Apple' works". Retrieved from the Internet at: <https://techcrunch.com/2019/06/07/answers-to-your-burning-questions-about-how-sign-in-with-apple-works/> (2020).
Clnet, "Sign In with Apple will come to every iPhone app: How the new privacy login tool works". Retrieved from the Internet at: <https://www.cnet.com/how-to/sign-in-with-apple-will-come-to-every-iphone-app-how-the-new-privacy-login-tool-works/> (2020).
Tom's Guide, "Sign in with Apple: How it works and how to use it". Retrieved from the Internet at: <https://www.tomsguide.com/news/sign-in-with-apple> (2020).
U.S. Appl. No. 15/480,314, Apparatus and Method for Automated Email and Password Creation and Curation Across Multiple Websites, filed Apr. 5, 2017.
U.S. Appl. No. 16/549,787, Apparatus and Method for Automated Email and Password Creation and Curation Across Multiple Websites, filed Aug. 23, 2019.
U.S. Appl. No. 16/773,561, Email Alert for Unauthorized Call, filed Jan. 27, 2020.

(56) References Cited

OTHER PUBLICATIONS

U.S. Appl. No. 16/773,578, Email Alert for Unauthorized Sms, filed Jan. 27, 2020.
U.S. Appl. No. 16/773,593, Phone Alert for Unauthorized Email, filed Jan. 27, 2020.
U.S. Appl. No. 16/773,616, Phone Alert for Unauthorized Call, filed Jan. 27, 2020.
U.S. Appl. No. 16/773,632, Phone Alert for Unauthorized Sms, filed Jan. 27, 2020.
U.S. Appl. No. 16/773,647, Email Alias Generation, filed Jan. 27, 2020.
U.S. Appl. No. 16/773,681, Unauthorized Authentication, filed Jan. 27, 2020.
U.S. Appl. No. 16/773,699, Data Integrity Checker, filed Jan. 27, 2020.
U.S. Appl. No. 16/773,534, Email Alert for Unauthorized Email, filed Jan. 27, 2020.
U.S. Appl. No. 16/773,669, Data Integrity Checker, filed Jan. 27, 2020.
Abdulghani et al. "A Study on Security and Privacy Guidelines, Countermeasures, Threats: IoT Data at Rest Perspective," Symmetry, MDPI, pp. 1-36, Jun. 10, 2019 (Year: 2019).
Lin et al. "Security in Enterprise Networking: A Quick Tour," IEEE Communication Magazine, Jan. 1996, pp. 56-61 (Year: 1996).
Ndibanje et al. "Security Analysis and Improvements of Authentication and Access Control in the Internet of Things," Aug. 13, 2014, pp. 14786-14805 (Year: 2014).
Non-Final Office Action, U.S. Appl. No. 16/773,578, dated Oct. 2, 2020.
Raghavendra et al. "Survey on Data Storage and Retrieval Techniques over Encrypted Cloud Data," International Journal of Computer Science and Information Security (IJCSIS), vol. 14, No. 9, Sep. 2016, pp. 718-745 (Year: 2016).
Response to Non-Final Office Action, U.S. Appl. No. 16/773,578, filed Oct. 29, 2020.
U.S. Appl. No. 16/773,709, Data Cycling, filed Jan. 27, 2020.
"Answers to your burning questions about how 'Sign in with Apple' works," Web page <https://techcrunch.com/2019/06/07/answers-to-your-burning-questions-about-how-sign-in-with-apple-works/>, listed date of Jun. 7, 2019, retrieved from Internet Archive Wayback Machine <https://web.archive.Org/web/20190607200205/https://techcrunch.com/2019/06/07/answers-to-your-burning-questions-about-how-sign-in-with-apple-works/> on Aug. 31, 2020.
"Sign In with Apple will come to every iPhone app: How the new privacy login tool works," Web page <https://www.cnet.com/how-to/sign-in-with-apple-will-come-to-every-iphone-app-how-the-new-privacy-login-tool-works/>, listed date of Jun. 6, 2019, retrieved from Internet Archive Wayback machine <https://web.archive.org/web/20190606171348/https://www.cnet.com/how-to/sign-in-with-apple-will-come-to-every-iphone-app-how-the-new-privacy-login-tool-works/> on Aug. 31, 2020.
"Sign in with Apple: How it works and how to use it," Web page <https://www.tomsguide.com/news/sign-in-with-apple>, listed date of Jan. 30, 2020, retrieved from Internet Archive Wayback Machine <https://web.archive.org/web/20200130190544/https://www.tomsguide.com/news/sign-in-with-apple> on Aug. 31, 2020.

\* cited by examiner

PHONE NUMBER ALIAS GENERATION

CROSS-REFERENCE TO RELATED APPLICATIONS

This application claims priority to and the benefit of U.S. Application Ser. No. 62/906,495, filed Sep. 26, 2019 and titled "DATA SECURITY AND IDENTITY ALIASES," the entire disclosure of which is expressly incorporated herein by reference.

TECHNICAL FIELD

The present disclosure generally relates to data security and, in particular, to techniques for generating email aliases that can be utilized to mitigate the impact of data breaches.

BACKGROUND

In recent years, companies have grown increasingly concerned about their exposure to risk and liability associated with data breaches involving personal information of customers, users, stakeholders, and others (hereinafter referred to collectively as "users" or "end-users"). To conduct most normal business processes, modern companies need to store users' email addresses, telephone numbers, and passwords for the purposes of communicating with users, enabling user account or profile management, and performing security operations such as user identification, (i.e., answering the question "who does this entity claim to be?"), authentication (e.g., answering the question "has this entity proven they are who they claim to be?"), and authorization (e.g., answering the question: "even if authenticated, is this entity permitted to perform the action in question?").

Unfortunately, the personal information that companies store and rely on is sensitive data. A bad actor can utilize this personal information for a number of purposes. Most obviously, when a company stores an email address and an associated password for a service provided by the company, any other person who gains access to that email address and associated password can access the service and any associated data (e.g., additional personal information, financial information, etc.). As another example, people often use the same username and password combination on a number of different services, and the username for many services is often a person's primary email address. Accordingly, a data breach can result in a bad actor not only gaining access to data and services provided by the compromised company; it can result in the bad actor accessing other services provided by different companies (e.g., resulting in compromised bank accounts, email accounts, cell phone plans, social media accounts, etc.). As yet another example, even when an end-user has been careful to utilize different passwords for different services, a data breach often results in a bad actor acquiring enough personal information to successfully go through a "password recovery" operation, enabling the bad actor to reset passwords to various services. In addition to the risk presented to end-users and the potential reputational damage that a company may suffer from a data breach, the company may be liable for damages incurred by the end-users as a result of the data breach.

Further, a company's exposure to risk and potential liability stemming from storing personal information is not merely theoretical. YAHOO recently suffered a data breach that resulted in compromised personal information including names, email addresses, dates of birth, and telephone numbers for 500 million users, resulting in a legal settlement of $117 million. Similarly, MARRIOT suffered a data breach resulting in compromised personal information for 500 million users and, as of 2019, is being sued for $12.5 billion. As a last example, EQUIFAX recently suffered a data breach resulting in compromised personal information for roughly 150 million users, resulting in an agreement to a settlement of over $700 million.

Note, this background description provides context to facilitate understanding and appreciating the detailed description below. Work of the presently named inventors, to the extent described in this background section (as well as aspects of the background description that may not otherwise qualify as prior art at the time of filing) are neither expressly nor impliedly admitted as prior art against the present disclosure.

SUMMARY

The disclosed systems and techniques enable an enterprise system (e.g., including a server hosting a resource) to store "alias information" (sometimes simply called an "alias") that is keyed to and represents "real information" such that the "real information" is not determinable from the stored "alias information." In operation, the enterprise system may receive "real information" (e.g., a phone number, an email address, a mailing address, a name, etc.) and may transmit the "real information" to an aliasing server, which may respond by generating the "alias information" and transmitting the "alias information" to the enterprise system for storage. When the enterprise system needs the "real information," it may send a request to the aliasing server with the "alias information" so that the aliasing server can identify the corresponding "real information."

Note, while the description below largely refers to "telecom addresses" in the context of operations performed by the aliasing system, it will be understood that in some embodiments the aliasing system may implement the same or similar functionality with respect to any suitable set of information other than a "telecom address." However, in some instances, a generated alias corresponding to this other set of information may not be addressable in the same manner that aliases for telecom addresses are addressable.

As a specific example, the disclosed techniques enable an enterprise system to store an alias contact email address or an alias contact phone number for a user while avoiding storing and managing any personal email addresses or phone numbers for the user. For example, the enterprise system may forward personal email addresses to an aliasing server (sometimes called a "relay server") configured to generate alias email addresses based on the personal email addresses. The aliasing server may operate as a "middle man" that receives emails directed to the email addresses and that forwards the emails (or the content of the emails) to the personal email addresses (when appropriate). The enterprise system may store and maintain the alias email addresses in lieu of the personal email addresses.

Advantageously, a company can implement the disclosed techniques to avoid exposure to potential risk and liability associated with a bad actor gaining access to the personal information. For example, if a bad actor gains access to an alias email address stored at the enterprise system, the bad actor may not be able to contact the end-user because the aliasing server may block messages from addresses or devices that are not whitelisted. Further, the bad actor may have no way of knowing the real personal email address corresponding to the alias address because the enterprise system may not maintain a record of the real, personal email addresses.

Note, this summary has been provided to introduce a selection of concepts further described below in the detailed description. As explained in the detailed description, certain embodiments may include features and advantages not described in this summary, and certain embodiments, may omit one or more features or advantages described in this summary.

BRIEF DESCRIPTION OF THE DRAWINGS

Each of the figures described below depicts one or more aspects of the disclosed system(s) or method(s), according to an embodiment. The detailed description refers to reference numerals included in the following figures.

DETAILED DESCRIPTION

Figure 1:
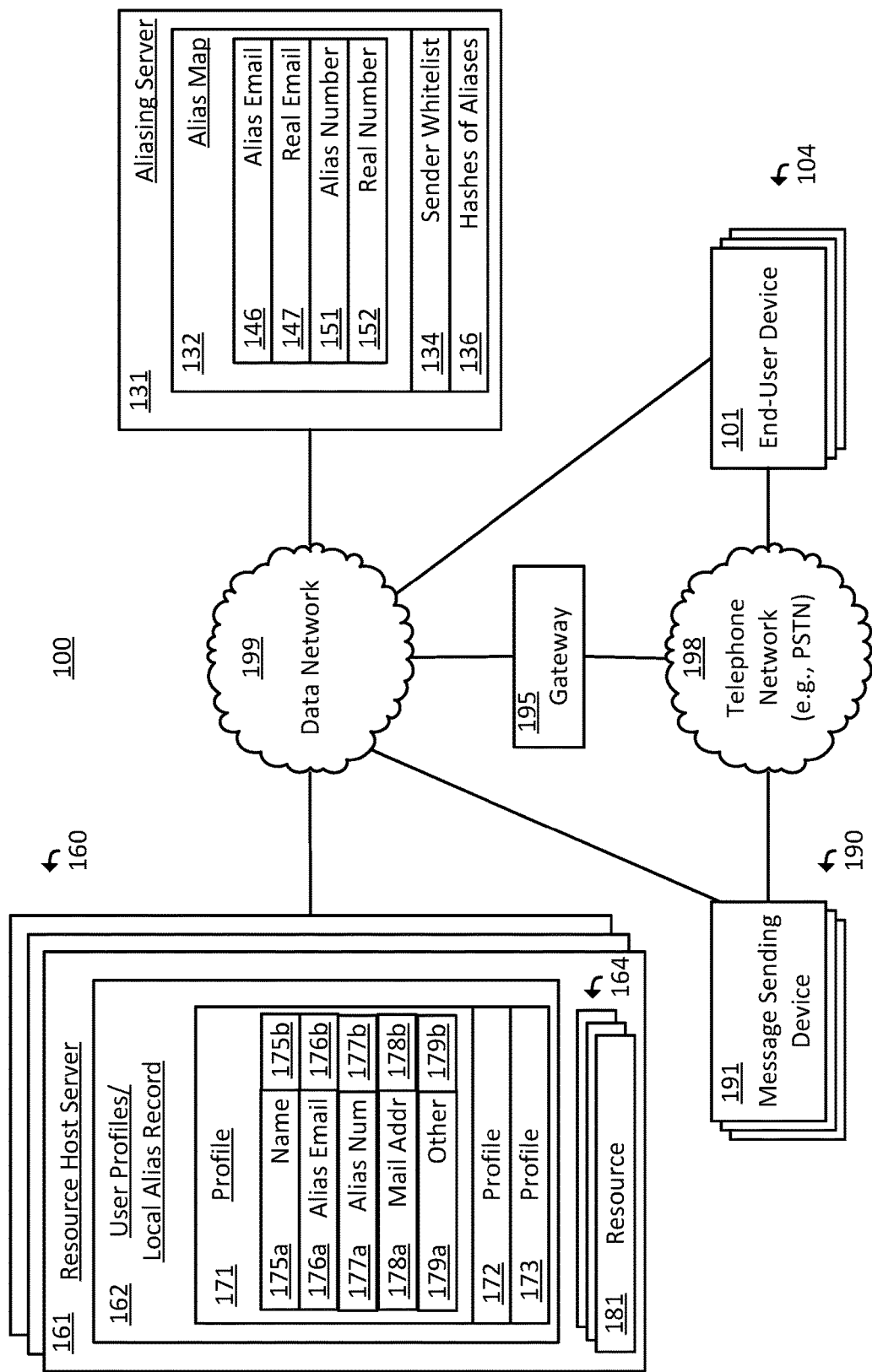
FIG. 1 is a block diagram of an example aliasing system for generating and utilizing alias telecom addresses for users.

The disclosed systems and techniques enable a company to identify, authenticate, and maintain contact information for end-users without requiring that the company store end-users' sensitive personal information. Utilizing application programming interfaces (APIs) or software development kits (SDKs), the company can take advantage of an aliasing system including an aliasing server that generates functional alias telecommunication (telecom) addresses for user's "real" telecom addresses (e.g., alias email addresses or alias telephone numbers) that subsequently functions as an intermediary address associated with the aliasing server, wherein the aliasing server is configured to route messages (e.g., phone calls, text messages, emails) between aliases and the user's "real" addresses linked to the aliases.

For example, the company may utilize a widget on a "sign in" or "sign up" web page or app page that tunnels a user's log-in information to the aliasing server (e.g., without the company's server necessarily storing the user's log-in information) so that the aliasing server can return the appropriate alias to the company's servers (also referred to herein as the "resource host servers," "resource host," or "host"). The company may then store and maintain the alias (e.g., as part of a user profile) instead of storing the user's primary or "real" telecom address (e.g., instead of storing the user's real email address or real telephone number).

As used herein, the phrase "telecom address" refers to an email address, a phone number, a network address (e.g., an IP address), or a hardware address (e.g., a MAC address). In some instances, the described aliasing system may generate and implement aliases for information other than "telecom addresses." For example, the aliasing system may generate aliases for one or more portions of a mailing addresses (e.g., an apartment number, a street number, a street name, a town, a zip code, a state, a country, etc.); one or more portions of a person's name (e.g., first, middle, or last name); one or more portions of a social security number (e.g., the first five digits, the last four digits, or the entire social security number); or any other suitable set of information. Said another way, the functionality described herein regarding addressable aliases and corresponding telecom address may also be implemented with respect to aliases for other types of information (i.e., information other than addressable telecom addresses). This "other" information, for which an alias may be generated and used, may not be addressable. For example, when an alias social security number represents a real social security, the real social security number and the alias social security number may not function as addresses to which messages (e.g., emails, telephone calls, text messages) can be sent.

The aliasing server, which may be implemented and managed by a different entity than the company controlling the host server, maintains a database or record tying unique aliases (e.g., alias email addresses or telephone numbers) to corresponding real email addresses or telephone numbers. After an alias has been generated, the aliasing server functions as a "middle man," receiving messages directed to the alias and forwarding the messages to the appropriate real telecom address (e.g., email address or telephone number). Thus, advantageously, the company can transmit emails to alias email-addresses and call or send text messages to alias telephone numbers to reach end-users without knowing or possessing the actual or "sensitive" email addresses and phone numbers for the users. These messages (e.g., emails, telephone calls, text messages) may be routed through the aliasing server, where the alias is "de-aliased" and routed to the real address for the end-users. The aliasing server may implement various rules to ensure that only messages from whitelisted senders are forwarded to the user's real email address or telephone number.

Further, the aliasing server may be configured to generate a unique alias, based on a user's real email address or telephone number, for every different web site or service utilizing the aliasing server. In other words, when a user attempts to sign-in to three different services or web sites, all utilizing the aliasing server, using the same email as a username, for example, the aliasing server may generate and rely on three different aliases for the user, each mapped to the user's real telecom address and to a different one of the services such that each alias is unique with respect to other aliases managed by the aliasing server. Said another way, in an embodiment, while a single real telecom address may map to multiple aliases, each unique pair of real telecom address and service may map to only a single alias.

Advantageously, a company can implement the disclosed techniques to avoid storing a user's personal information, and to thus avoid potential risk and liability associated with a bad actor gaining access to that personal information. For example, if a bad actor gains access to an alias email address stored on a company server, the bad actor may not be able to contact the end-user because the aliasing server may block messages from senders that are not whitelisted. Further, the bad actor may have no way of knowing the real email address corresponding to the alias address in embodiments because the company servers may not maintain a record of this information. Additionally, the aliasing server can mitigate the fallout from a breach by simply issuing a new alias for the user, notifying the company server of the updated alias, and deactivating the compromised alias.

Further still, even if the bad actor gains access to a password stored on a company server that is part of a username/password combination along with the alias, the bad actor may not be able to use that alias and password combination to access other services. As previously noted, end-users often use the same username/password combination for a number of services. Thus, when a data breach occurs, a bad actor may attempt to use the username/password not only on the service associated with the data breach, but on numerous banking, social media, and other websites, simply hoping that the end-user used the same username/password combination for multiple services. Because the disclosed techniques may generate and utilize unique aliases for each service, and because the burden to utilize unique sign-in information for every service is moved away from the end-user, the risk of a data breach resulting in a bad actor gaining access to multiple services is significantly mitigated.

Additionally, the disclosed systems may provide companies with early data loss detection. In particular, a company may be notified by the aliasing server when unauthorized communications or authentications are attempted. As an example, a user attempting to directly sign-in with an alias may qualify as suspicious behavior that triggers a notification because, typically, the user signs in with a "real" email address. And in fact, in many instances the user may be completely unaware of his or her alias. As another example, someone outside the organization attempting to transmit a message to an alias may qualify as suspicious behavior that triggers a notification because, typically, only a pre-authorized set of originating/sender addresses or phone numbers will exist on a whitelist (e.g., email addresses or phone numbers from within the organization). Further, the aliasing server may decrease mean-time-to-identify (MIT) and mean-time-to-contain (MTC) for a company with regard to unauthorized communications and authentications, as the aliasing server can quickly provide diagnostics regarding the nature of the alias being used and the nature of the originating device (or potentially the originating party), enabling the company to quickly identify and contain the threat. As an example, each alias may be time stamped, so if a particular alias is exposed, the company can determine what time "block" of data was exposed.

Advantageously, the disclosed techniques also enable the owner or controlling entity of the aliasing server to enjoy less risk and liability exposure than one might assume. First, the entity maintaining the aliasing server may be "zero knowledge," meaning that most pieces of "real" data stored via the aliasing server may be encrypted before being received, and the corresponding encryption keys for the data may not be stored at the aliasing server. In an embodiment, the encryption/decryption keys are managed by a key management system ("KMS") via a KMS server, for example. In any event, in some embodiments, if a data breach is suffered, a bad actor would only gain access to, at most, useless strings of data and the aliases they correspond to. Second, because the aliasing server generates aliases and acts as a "middle man" between a company's servers and the end-user devices, the aliasing server does not store passwords in some embodiments. Said another way, passwords may not be stored or managed by the same system storing or managing the real telecom addresses (e.g., real email addresses). As a result, in such embodiments, even if a data breach involving the aliasing server occurs, a bad actor may at most learn which aliases correspond to which "real" telecom addresses. Because the aliasing server typically does not store passwords, a bad actor generally cannot gain access to any username/password combinations by accessing the aliasing server records. Here again, because a bad actor cannot learn username/password combinations by gaining access to the aliasing server records, the risk of a data breach resulting in a bad actor gaining access to multiple services via a single username/password combination is significantly mitigated.

As yet another advantage, the disclosed systems and techniques may be invisible to the end-user of the host server. As far as the user can tell, she provides her normal email address or telephone number like she normally would when prompted by a service (e.g., during a "sign up" or "sign in" process). Accordingly, when the disclosed techniques are implemented, the end-user can avoid going through a complicated user authentication procedure (e.g., the user does not need to remember a unique username and password a service). And even when the end-user utilizes the same email/password for multiple sites, if the multiple sites all utilize the aliasing server, the user can gain the advantage of having distinct email/password combinations for each site from the perspective of each site or business because the aliasing server may implement a unique alias for each site (which the company then stores at its servers rather than storing the user's real email address).

The disclosed systems and techniques may implement additional or alternative security measures in some embodiments. For example, the aliasing system may detect when an end-user attempts to provide an alias (rather than his or her real address) to the enterprise system during an authentication procedure. The aliasing system may facilitate a rejection of this authentication attempt in light of an expectation that the end-user may have no awareness of his or her alias. In other words, when a user provides an alias instead of a real address, this may suggest that the alias has been compromised, and the aliasing system may respond accordingly. Further still, in an embodiment, the disclosed systems and techniques enable data integrity checks by the enterprise system (e.g., the resource host) to verify that a local alias address (e.g., managed by the resource host) matches an alias maintained by the aliasing system or server. In an embodiment, the disclosed systems and techniques enable data cycling operations for the aliasing system to refresh first copies of aliases maintained by an aliasing server and second copies of the aliases maintained by the enterprise server. This data cycling can ensure that the resource host and aliasing server have relatively "new" aliases at any given time. Thus, even if an alias is somehow compromised, it may not remain valid for a long period of time. The data cycling may occur manually or automatically on a scheduled, random, or semi-random basis.

Various techniques, systems, and methods are discussed below with reference to FIGS. 1-11. The description below is divided into the following sections:

I. Example Systems and Devices
II. Example Methods
III. Additional Considerations

I. Example Systems and Devices

FIG. 1 is a block diagram of an example aliasing system 100 for generating and utilizing alias telecom addresses for users. As used herein, the phrase "telecom address" refers to any address that can be referenced to transmit communication signals (via one or more telecommunication networks including wire, radio, optical, or other electromagnetic systems) to a particular one or more devices or systems that have been assigned the address. Example telecom addresses include email addresses, telephone numbers, hardware address (e.g., MAC addresses), and network addresses (e.g., IPv4 or IPv6 addresses).

The aliasing system 100 includes (i) one or more end-user devices 104 (e.g., computing devices such as mobile phones, tablets, laptops, desktops, etc.), including an end-user device 101; (ii) an aliasing server 131 (sometimes "relay server 131"); (iii) one or more resource host servers 160 (e.g., each associated with a different service or web site) including a resource host server 161, and (iv) one or more message sending devices 190, including a message sending device 191. In some embodiments the system 100 may include multiple aliasing servers similar to the aliasing server 131.

Depending on the embodiment, any one or more of the devices 104, 131, 160, 190, and 195 may be (i) coupled to a data network 199 or a telephone network 198 and (ii) coupled to any one or more of each other via the networks 198 or 199.

In example operation, the end-user device 101 transmits a primary or "real" telecom address (also referred to herein as "real address" or a "user address") for a user to the resource host server 161, which then forwards the real address to the aliasing server 131. The aliasing server 131 generates a unique alias telecom address (also referred to herein as "alias address" or "alias") based on the received real address, stores a real address/alias pair to memory for later reference, and transmits the alias to the resource host server 161 so that the resource host server 161 can store the alias as a contact address for the user. The alias represents an address for the aliasing server 131. Consequently, a message (e.g., emails, phone calls, text messages) addressed to the alias is received by the aliasing server 131. The aliasing server 131 may respond to receiving the message by: (i) generating a sender alias based on the originating address for the message; (ii) generating a new message including the same message content from the original message but that is "from" the sender alias and addressed to the real address associated with the alias for the user; and (iii) transmitting the new message to the real address. By generating a sender alias for the sender, the system 100 maintains its position as a middle man and protects the relative anonymity of the real address associated with the alias. For example, if a sender alias is not utilized, the end-user might accidentally respond directly to the originating address and expose his or her real address to the originating address (e.g., by starting an email chain between the real and originating addresses).

In any event, the remainder of this section describes example structure for the aliasing system 100 before turning to example methods and techniques that may be implemented via the aliasing system 100.

The data network 199 (also referred to as the "computer network 199") is a telecommunications network including a set of nodes (e.g., devices or systems capable of sending, receiving or forwarding information) and links which are connected to enable telecommunication between the nodes, wherein the nodes are computing devices configured to exchange data with one or more of the other nodes in the network 199. The data network 199 may include dedicated routers, switches, or hubs responsible for forwarding or directing traffic between nodes, and, optionally, dedicated devices responsible for configuring and managing the network 199. Some or all of the nodes may be also adapted to function as routers in order to direct traffic sent between other nodes. The nodes may be inter-connected in a wired or wireless manner, and may have different routing and transfer capabilities. The links between nodes in the network 199 may have different throughput capabilities and different attenuation characteristics. A fiber optic cable, for example, may be capable of providing a bandwidth several orders of magnitude higher than a wireless link because of the difference in the inherent physical limitations of the medium. The network 199 may include networks or sub-networks, such as a local area network (LAN) or a wide area network (WAN) (e.g., the Internet). Any one or more of the systems or devices 104, 131, 160, 190, and 195 may be nodes of the data network 199, and may be coupled to the network 199 via a link that enables data transmission. The network 199 may be or include a network utilizing one or more protocols from the Internet protocol suite (e.g., TCP/IP).

The telephone network 198 is a traditional telephony network including a set of nodes and links which are connected to enable telephony communication between the nodes, wherein the nodes are devices configured to establish telephone calls between other nodes of the network 198. The network 198 may be or include: (i) a landline network that utilizes a telephone exchange, such as the public switched telephone network (PSTN) or a private branch exchange (PBX) (utilizing protocols such as signaling system 7 or SS7); (ii) a wireless network such as a cellular network that utilizes cellular base stations or cell cites (utilizing protocols such as GSM, CDMA, AMPS, GPRS, EDGE, UMTS, etc.); or (iii) any other suitable private or public telephone network.

The gateway 195 is a computing device that functions as a communication gateway between traditional telephony networks and data networks. The gateway 195 may include: (i) a first communication interface configured to enable communication between the gateway 195 and the network 199 by way of using one or more protocols utilized by the data network 199 and (ii) a second communication interface configured to enable communication between the gateway 195 and the network 198 by way of using one or more protocols utilized by the telephone network 198. The gateway 195 may be assigned numerous telephone numbers (e.g., by one or more routing or forwarding nodes in the network 198), and it may maintain a table mapping the telephone numbers to network addresses (e.g., IP addresses). For example, for the alias telephone numbers managed by the aliasing server 131, the gateway 195 may map each alias telephone number to a network address for the aliasing server. The gateway 195 can reference this table to encode telephone calls for transmission via the data network 199 (e.g., according to VOIP or similar protocols or standards) and can then transmit the calls to the aliasing server 131 via the data network 199. In such an example, the alias 151 stored to the map 132 may serve as an address for the gateway 195.

Each of the devices 101 and 191 may be coupled to the telephone network 198 and may establish telephone calls with each other or any other node of the telephone network 198.

In an embodiment, any one or more of the device 101, the server 131, and the server 161 is an electronic computing device, such as a general purpose computer or a mobile computing device. The servers 131 and 161, in particular, may each be any typical desktop or host computer configured to function as a server in a networked environment.

A. Example Hardware Components of the Devices 101, 131, and 161

Figure 2:
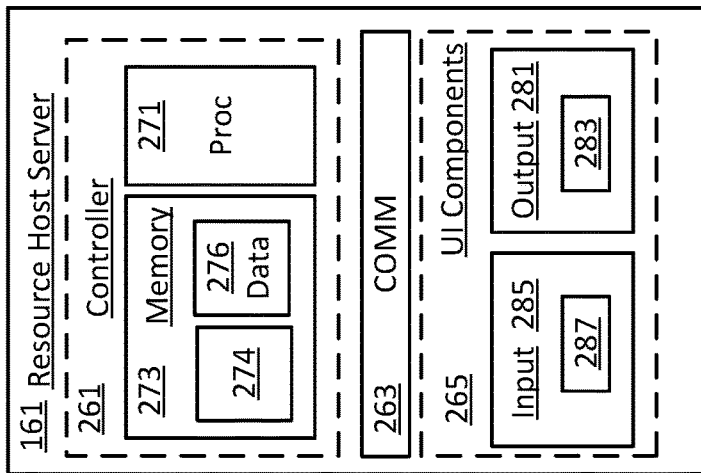
FIG. 2 is a block diagram of hardware components of an end-user device, an aliasing server, and a resource host server of the aliasing system.
Figure 2:
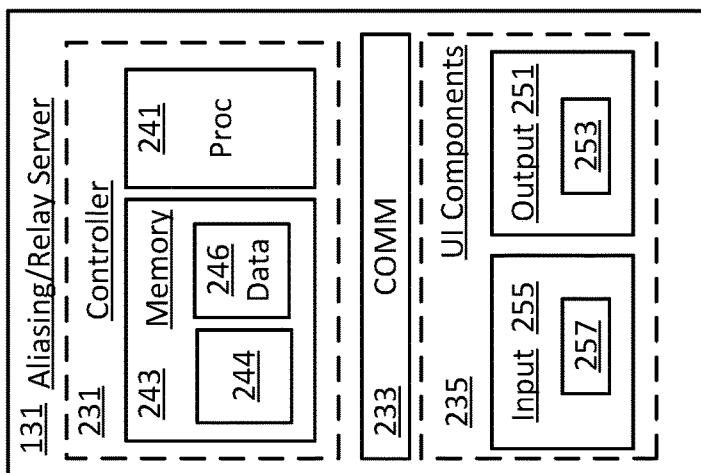
Figure 2:
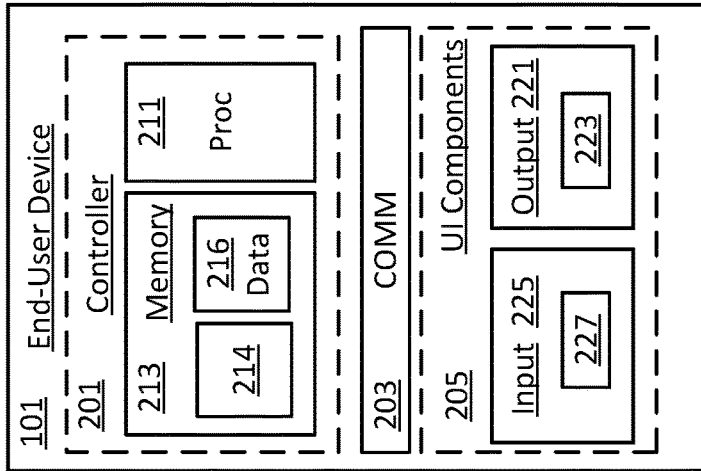

Turning to FIG. 2, a block diagram of the hardware components of the end-user device 101, the aliasing server 131, and the resource host server 161 is shown.

The end-user device 101 (also referred to as the "user device 101" or "device 101") may include: (i) a controller 201 including a processor 211 and a memory 213 coupled to the processor 211 (e.g., via a bus—not shown); (ii) a communication interface 203 coupled to the controller 201 (e.g., via the bus); and (iii) a set of UI components 205 coupled to the controller 201 (e.g., via the bus), including one or more UI output components 221 and one or more UI input components 225. The memory 213 may include a module or routine 214 configured to implement the functionality described herein as being provided by the device 101. The memory 213 may also include a set of data 216, which may include input data utilized by the routine 214, output data generated by the routine 214, or other data utilized by the routine 214 or by another routine (not shown) implemented by the device 101. The one or more UI output components 221 may include an electronic display 223 (e.g., an LCD display), and the one or more UI input components 225 may include touch sensors 227 integrated within the display 223 (or any other suitable input device or component) for detecting user input. The components of the device 101 may be disposed within or throughout a housing of the device 101. In an embodiment, the system 100 includes multiple end-user devices similar to the device 101.

Staying with FIG. 2, the aliasing server 131 (also referred to as the "server 131" or the "relay server 131") may include: (i) a controller 231 including a processor 241 and a memory 243 coupled to the processor 241 (e.g., via a bus); (ii) a communication interface 233 coupled to the controller 231 (e.g., via the bus); and (iii) a set of UI components 235 coupled to the controller 231 (e.g., via the bus), including one or more UI output components 251 and one or more UI input components 255. The memory 243 may include a module or routine 244 configured to implement the functionality described herein as being provided by the aliasing server 231. The memory 243 may also include a set of data 246, which may include input data utilized by the routine 244, output data generated by the routine 244, or other data utilized by the routine 244 or by another routine (not shown) implemented by the server 131. The one or more UI output components 251 may include an electronic display 253 (e.g., an LCD display), and the one or more UI input components 255 may include a keyboard 257 or any other suitable input device for detecting user input. In an embodiment, the described functionality provided by the aliasing server 131 may be provided by any suitable number of aliasing servers 131. That is, in some embodiments, the aliasing server 131 may be implemented as a distributed system including, e.g., any desired number of computers, servers, databases, local or remote memories, etc. For example, in some embodiments a first server 131 may handle alias generation, a second server 131 may handle message relaying, a third host 161 may handle data maintenance (e.g., data integrity checks or data cycling), etc. The components of the server 131 may be disposed within or throughout a housing of the server 131.

Remaining with FIG. 2, the resource host server 161 (also referred to as the "resource host 161," the "host 161," the "resource server 161," or the "server 161") may include: (i) a controller 261 including a processor 271 and a memory 273 coupled to the processor 271 (e.g., via a bus); (ii) a communication interface 263 coupled to the controller 261; and (iii) a set of UI components 265 coupled to the controller 261, including one or more UI output components 281 and one or more UI input components 285. The memory 273 may include a module or routine 274 configured to implement the functionality described herein as being provided by the host 161. The memory 273 may also include a set of data 276, which may include input data utilized by the routine 274, output data generated by the routine 274, or other data utilized by the routine 274 or by another routine (not shown) implemented by the host 161. The one or more UI output components 281 may include an electronic display 283 (e.g., an LCD display), and the one or more UI input components 285 may include a keyboard 287 or any other suitable input device for detecting user input. In an embodiment, the described functionality provided by the relay host 161 may be provided by any suitable number of hosts 161. That is, in some embodiments, the host 161 may be implemented as a distributed system including, e.g., any desired number of computers, servers, databases, local or memories, etc. For example, a first host 161 may host and manage access to the resources 164, a second host 161 may handle user authentication (e.g., in conjunction with the server 131), a third host 161 may handle user authorization, etc. The components of the host 161 may be disposed within or throughout a housing of the host 161.

As noted above, each of the devices 101, 131, and 161 may include a bus. Generally speaking, a bus is a communication system that transfers information between components inside a computer system, or between computer systems. Each reference to a "bus" may refer to a data bus (for carrying data), an address bus (for determining where the data should be sent), a control bus (for determining the operation to execute), or some combination thereof. Further, when the functionality attributed to any of the devices 101, 131, or 161 is implemented by a plurality of devices, the plurality of devices may communicate with each other via any suitable network communication standards or protocols.

Returning to FIG. 1, the disclosure below describes example data stored and utilized by the host 161 and the aliasing server 131 to provide alias generation, user authentication, message relaying, and a number of other operations.

B. Example Resources 164 Hosted by the Host 161

The resource host server 161 may store (at the memory 273) a local alias record or set of user profiles 162 (e.g., including user profiles 171-173, each storing relevant alias(es)) and a set of resources 164 (e.g., including a resource 181). Each of the resources 164 may be any suitable web resource or a collection of resources and may include any one or more resources such as a file, a document, an image, a video, audio, or a service (e.g., a piece of software designed to perform a certain set of tasks, such as enabling cloud storage, enabling social media communications, enabling access to other resources, enabling shopping via the web, providing scores or articles related to sports, enabling access to a bank account, etc.).

Generally speaking, end-user devices such as the device 101 may establish a link (via the network 199) to the host 161 and may request or otherwise receive access to one or more of the resources 164. In some instances, the host 161 may identify and authenticate a user (via information transmitted from the device 101 to the host 161) before authorizing the user to access one or more of the resources 164. For example, a user may be required to "sign in" or "sign up" before being authorized to access one or more of the resources 164.

C. Example User Profiles 162 Implemented by the Host 161

The user profiles or local alias records 162 of the host 161 may include information regarding a particular user, such as contact information, identifying information, user preferences, etc. Each user profile 162 may be generated after a user has provided sufficient personal information (e.g., an email address, a password, etc.) to identify or authenticate himself or herself. In any event, each user profile 162 may store personal information for a user. Specifically, each user profile 162 may store one or more aliases for real telecom addresses for a user.

As an example, the user profile 171 may include any one or more of a plurality of variables 175a-179a storing values 175b-179b. The name variable 175a stores a name 175b of the user (e.g., "John Smith"). The alias email variable 176a stores an alias email address 176b for the user (e.g., "poiuefa@alias.com"). The alias phone number variable 177a stores an alias phone number 177b for the user (e.g., "1-342-274-0983"). The mailing address variable 178a stores a mailing address 178b (e.g., "Chicago, Ill., 60606"). The other variable 179a may be any suitable variable storing any suitable value. For example, the profile 171 may include one or more variables 179a representing user preferences associated with a service provided by an entity controlling the host 161, notes associated with the user, demographic information for the user, etc.

In some instances, it may be desirable to maintain a minimal amount of information in the user profiles 162. For example, in an embodiment, each user profile 162 includes only an email alias 176a or only a phone number alias 177a. In an embodiment, each user profile 162 includes only two variables: an email alias 176a and the phone number alias 177a. In other embodiments, the user profiles 162 may be more robust (e.g., as shown in FIG. 1).

In some instances, the host 161 may include stored or verified authentication information for each user (e.g., authentication credentials previously provided by the user or server 131). The host 161 may compare candidate authentication credentials (e.g., received from the server 131) for a user from the end-user device 101 to one or more sets or pairs of stored authentication credentials. Based on verifying a match, the host 161 may authenticate the user. If the set of candidate credentials does not match one of the sets of stored authentication credentials, the host 161 may fail the authentication attempt.

To acquire the candidate authentication information, the host 161 may interact with both the end-user device 101 (e.g., to receive a real address and a password) and the server 131 (e.g., to receive an alias mapped to the real address). The host 161 may utilize the alias and password as candidate authentication information, and may compare the authentication information to locally stored authentication information (e.g., a known or verified alias/password combinations).

The stored authentication credentials may include known credentials such as an identity/password combination. The identity may be a name, an email address, a phone number, or a mailing address. The password may be any suitable text-based password, code or pin; a set of gestures; a pattern (e.g., provided via a grid of dots); etc. Any one or more of the variables 175a-179a may serve as stored identity credentials. When the host 161 relies on passwords for authentication, each of the user profiles 162 may store a password for the respective user.

The stored authentication credentials may include possessed credentials, such as a device or dongle specifically assigned to the user. The device or dongle may provide a token in a connected manner (e.g., USB) or disconnected manner (e.g., via audio or display output, which the user may then provide to the end-user device 101; the provided token, if legitimate, should match a token generated by an authenticator (e.g., the host 161)).

Further still, the stored authentication credentials may include inherited credentials. Example inherited credentials include biometric markers such as a face, a retina, a fingerprint, or voice recognition. The end-user device 101 may scan any one of these biometric markers for comparison to stored biometric markers (e.g., gathered during a sign-up procedure).

Any combination of known, possessed, and inherited factors or credentials may be utilized to authenticate a user. In some instances, the stored authentication credentials are stored to a server or set of servers dedicated to performing authentication operations. The host 161 may be linked to such an authentication system, and may pass candidate authentication credentials received from the end-user device 101 to the authentication system. The authentication system may then message the host 161 to indicate whether the authentication succeeded or failed (e.g., based on a comparison of the candidate authentication credentials to the stored authentication credentials).

D. Example Alias Maps 132 Implemented by the Aliasing Server 131

Staying with FIG. 1, the aliasing server 131 may include any one or more of: an alias map or alias maps 132, a sender whitelist 134, and a record 136 hashes of aliases. At a high level, the aliasing server 131 is configured to (i) receive "real" telecom addresses (such as an end-user's telephone number or email address) from the host 161 and (ii) generate a unique alias based on the real address. The aliasing server 131 then transmits the generated alias to the host 161 so that the host 161 can store the alias in lieu of storing the real telecom address for the user. The aliasing server 131 also stores the alias to the map 132 at an accessible memory (e.g., the memory 243 shown in FIG. 2) such that the alias is mapped to the corresponding real address. In an embodiment, a single user telecom address may have a different alias for every different service. Said another way, in some embodiments, a real address may map to multiple aliases. In such embodiments, however, each of the multiple aliases for the real address may be associated with a different server or service. Said another way, each alias in the map 132 may map to a different user telecom address/service pair.

Accordingly, the map 132 enables the host 161 to identify a "real" telecom address based on a given alias. By comparison, other devices (such as the host 161) may have no record of the real telecom addresses tied to the aliases. As a result, even if the user profiles 162 of the host 161 were to be compromised by a bad actor, the bad actor would have no way of determining a user's real telecom address (e.g., a real email address) from a stored alias (e.g., the alias email address 176a).

To illustrate, the alias map 132 includes one or more aliases and one or more "real" telecom addresses corresponding to each alias. For example, the map 132 may include an alias-email address 146 for a user and a real email address 147 for the user that corresponds to the alias email address 146. Similarly, the map 132 may include an alias phone number 151 for the user and a real phone number 152 for the user that corresponds to the alias phone number 151. If desired, the map 132, or the information stored therein, may be encrypted using any suitable encryption method.

In some instances, the alias map 132 may include set of contact addresses (e.g., phone numbers or email addresses) for each service or service/alias combination included in the map 132 (the set(s) of contact phone numbers may be referred to as a "record of contact phone numbers"). These contact addresses may be utilized to notify the services with which they are associated of any relevant notifications (e.g., alarms regarding suspicious activity, unauthorized communications, unauthorized authentications, etc.). In some instances, the record of contact addresses for a given service is simply the set of addresses included in the whitelist for given service and alias. That is, when a service needs to be notified of something pertaining to a particular alias, the system 100 may generate and transmit message(s) to addresses included in the whitelist for that particular service and particular alias.

The host 161 may include a local alias record distinct from the alias map 132. By "local," it will be understood that alias record is accessible to the host 161. The local alias record may be stored to a local memory on the same device as the host 161, or may be stored to a host for a database communicatively coupled to the host 161, for example. The user profiles 162 may function as the local alias record and may be referred to as the local alias record(s) 162, though it should be noted that the local alias record may include information other than aliases if desired (e.g., names, mailing addresses, passwords, etc.).

In normal operation, this local alias record is synced to the alias map 132 managed by the server 131 because it includes aliases generated by the server 131. Note, generally speaking, references to the local alias record at the host 161 being "synced" to the alias map 132 at the server 131 refer to a state in which the aliases in the local alias record can also be found in the alias map 132. Unlike the alias map 132, however, the local alias record at the host 161 generally does not include real addresses, let alone a map mapping aliases to real addresses. That is, the host 161 is generally "unaware" of the real addresses mapped to the aliases. Advantageously, however, the host 161 can message the aliases (e.g., via emailing, calling, or texting) to contact the users because the server 131 typically receives such messages and routes them to the corresponding real addresses based on a look-up of the alias map 132. Stated more generally, the server 131 acts as a relay between alias addresses and real addresses.

Syncing the alias map 132 and the local alias record(s) may occur automatically or manually. Automatic syncing may occur in response to a trigger (e.g., based on a time interval or schedule). Manual syncing may occur in response to a user of the resource server 161 or the aliasing server 131 initiating the syncing (e.g., by interacting with a GUI element).

In some instances, someone may alter an alias at the local alias record of the host 161. Generally speaking, this is not a permitted activity—alias modifications should generally occur by way of the server 131. When an unpermitted direct modification of such an alias at the host 161 occurs, the local alias record will cease to be synced to the alias map 132. The host 161 and the server 131 may become aware of the unpermitted modification to the alias by performing a data integrity check.

E. Example Whitelists 134 Implemented by the Aliasing Server 131

The sender whitelist 134 is a set of telecom addresses (e.g., email addresses or telephone numbers) stored to memory that are authorized to transmit a message (e.g., an email, call, or text) to a user via a particular alias. To illustrate, in response to the aliasing server 131 receiving an email directed to the alias email address 146 (e.g., from the device 191), the aliasing server 131 may only forward the message to the corresponding real email address 147 when the originating email address for the received email is included in the whitelist 134. The device from which the message may be referred to as the "originating device."

If the originating email address is not included in the whitelist 134, the server 131 does not forward the message to the real email address 147. Likewise, in response to the aliasing server 131 receiving a telephone call directed to the alias telephone number 151 (e.g., from the device 191), the aliasing server 131 may only forward the call to the corresponding real phone number 152 in response to determining the originating phone number is included in the whitelist 134. If the originating phone number is not included in the whitelist 134, the server 131 may not forward the call to the real number 152.

A whitelist similar to the whitelist 134 (e.g., listing "authorized" email addresses or phone numbers) may exist for each alias included in the alias map 132.

F. Example Record 136 of Hashes Implemented by the Aliasing Server 131

The record 136 is a set of hashes, stored to memory, of aliases included in the map 132. For example, the aliasing server 131 may implement a hash function utilizing the aliases (e.g., the alias 146 or the alias 151) as an input (the input for the hash function may be referred to as a "key"). In an embodiment, the server 131 implements a hash function within, or as part of, an encryption/decryption function. For example, in an embodiment, the aliasing server 131 implements GCM or AES-GCM techniques to run a hash function in an encryption algorithm, enabling the encryption/decryption and integrity check to occur in a single process. In an embodiment, the hash functions 136 are stored to long term storage. In an embodiment, the hash functions 136 are generated as needed (e.g., to compare hashes) and are not stored to long term storage.

The hash function outputs a unique hash for every different key or input (i.e., for every different alias used as input). For example, when the alias 146 is used as an input, the hash function will always produce the same hash value. Further, any alias or input value other than the alias 146 will not produce the same hash value, even if the other input value only differs from the alias 146 by a single character. Advantageously, the input value (e.g., the alias 146 or the alias 151) cannot be determined from the output hash value. Thus, a bad actor gaining access to a hash value stored to the server 131 or included in a network message generally cannot learn the alias corresponding to the hash value.

The record 136 may be utilized to verify that an alias maintained by the host 161 (e.g., the alias email 176*b*) for a particular user has a matching alias stored at the aliasing server 131 (e.g., the alias email address 146) without requiring either of the servers 131 or 161 to transmit the actual alias (thus avoiding the possibility that an intercepting party learns of the alias).

Rather, the host 161 can simply implement the same hash function utilized by the aliasing server 131 to generate a first hash value using the alias 176b as a key, and can then transmit the first hash value to the aliasing server 131. The aliasing server 131 can then compare (i) the first hash value for the alias 176b and (ii) a second hash value generated by the server 131 using the alias 146 as a key. When the first and second hash value match, the alias 176b necessarily matches the alias 146. Thus, the server 131 (or any other suitable device having access to the two hash values) can conclude that the aliases 176b and 146 match. Further, the server 131 can conclude that the host 161 has an accurate and up-to-date alias for the real email address 147 (despite the host 161 not having a record of the real email address 147). If the first and second hash values do not match, the aliases 146 and 176b do not match. Assuming these aliases should match (e.g., assuming both should be an alias for the real email address 147), the server 131 may generate an alarm or notification indicating an alias mismatch between the host 161 and the server 131. The server 131 may initiate an operation to update the alias variable 176a (e.g., to have a value identical to the alias 146).

G. Example Alias Map 132 including Aliases Mapped to Real Telecom Address

Figure 3:
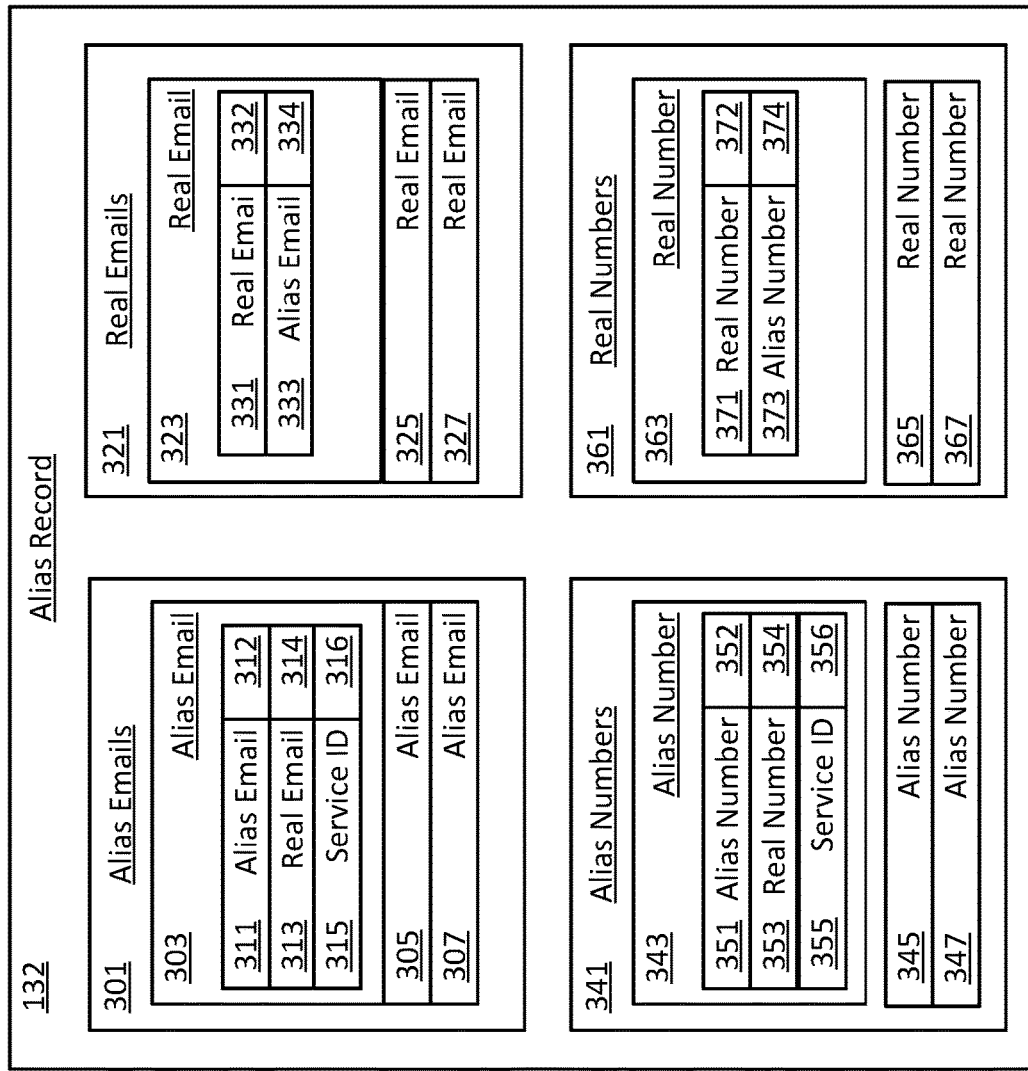
FIG. 3 is a block diagram of an alias map according to an embodiment in which aliases are mapped to real telecom addresses via a relational schema.

FIG. 3 is a block diagram of the alias map 132 according to an embodiment in which aliases are mapped to real telecom addresses via a relational schema.

For example, the map 132 may include a set of alias email addresses 301 (e.g., including alias addresses 303-307), a set of real email addresses 321 (e.g., including real addresses 323-327), a set of alias phone numbers 341 (e.g., including alias numbers 343-347), and a set of real phone numbers 361 (e.g., including real phone numbers 363-367).

To link aliases to real contact information, each address or phone number in the map 132 may be stored as a table. For example, the alias email address 303 may be a table including multiple attributes 311, 313, and 315. The alias ID (or alias email address) attribute 311 may have a value 312 representing the actual unique alias email address (e.g., "poiuefa@alias.com"). The address 303 may also include a real email ID (or real email address) attribute 313 having a value 314 representing the real address for which the alias email address 312 is an alias. The value 314 can be utilized to reference a particular table (e.g., the real email table 323) from the set of real emails 321. Finally, the table 303 may include a "Service ID" attribute 315 including a value 316 that is unique to service or website that requested the alias for the real email address 313/314 (e.g., a service or website associated with the host 161).

The table 323 includes a real ID or real email address attribute 331 having a value 332 (e.g., matching the value 314 in the table 303) and an alias email address attribute 333 having a value 334 (e.g., matching the value 312) that can be utilized to reference a particular table from the tables 303-307 in the alias email addresses 301.

Note, in an embodiment, while every alias in the set of alias email tables 301 and the alias number tables 341 is unique and has only a single corresponding real address (e.g., a single real email address or phone number), a single real address from the tables 321 or 361 may correspond to multiple aliases. That is, at any given time, an alias may be linkable to only one real address. By comparison, at any given time, a real address may be linkable to multiple aliases. This is possible because a different alias may be generated for a single real address for multiple services. As a result, the real email address table 323, for example, may include multiple alias attributes similar to the alias email address 333. For example, the table 323 may include the real email attribute 331, a first alias attribute 333 for a first service, a second alias attribute for a second service (not shown), etc.

The example alias number table 343 may include attributes 351/353/355 having values 352/354/356. These attributes and values may be similar to the attributes 311/313/315 and the values 312/314/316 of the alias email table 303, but may represent and store alias phone numbers and real phone numbers instead of alias email addresses and real email addresses. Likewise, the real number table 363 may include attributes 371 and 373 having values 372 and 374. These attributes may be similar to the attributes 331/333 and the values 332/334 of the real email table 323, but may represent and store real phone numbers and alias phone numbers instead of real email addresses and alias email addresses. The tables 343-347 may be linked to the tables 363-367, similar to the manner in which the tables 303-307 are linked to the tables 323-327.

H. Example GUI Element 400 for Receiving Real Addresses

Figure 4:
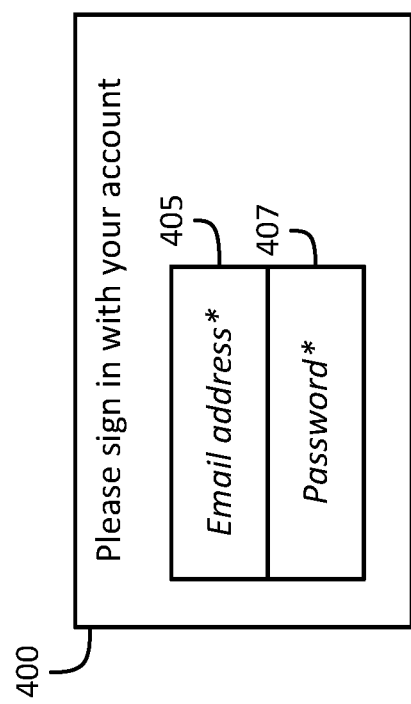
FIG. 4 depicts a GUI element that may be displayed by the end-user device to prompt a user to provide an email address via a field.

FIG. 4 depicts a GUI element 400 that may be displayed by the end-user device 101 to prompt a user to provide an email address via a field 405. As shown, the GUI element 400 may also prompt a user to provide, via a field 407, a password that, e.g., may authenticate the user to the host 161 so that the host 161 will enable the user to access one or more of the resources 191. The host 161 may only authenticate the user when the provided email and password match stored email and password credentials.

In example operation, a web site or application host by the host 161 may cause the device 101 to display the GUI element 400 (e.g., in response to detecting an indication that the user wants to sign in or sign up for a service). The user may enter the real email address 147 in the field 405. The device 101 may transmit, via the network 199, the real address 147 to the host 161. The host 161 may pass the real address 147 to the aliasing server 131. In an embodiment, host 161 tunnels the real address 147 to the server 131 in a manner that prevents the host 161 from accessing or learning of the address 147 (e.g., host 161 receives the real address 147 as an encrypted set of data, which it then transmits to the server 131). In an embodiment, the host 161 may access or learn of the address 147, but may delete any record of the address 147 after forwarding the address 147.

In any event, the aliasing server 131 may respond to receiving the address 147 by generating a unique alias and may store the unique alias as the alias email address 146 to the map 132 in a manner that links the alias 146 to the real address 147. In an embodiment, all or some of the map 132 is encrypted. The server 131 then transmits the alias 146 to the host 161, and the host may store the alias 146 as a contact email address for the user (e.g., by storing the alias 146 to the alias email address variable 176a.

In an embodiment, a GUI element similar to the GUI element 400 may be shown to prompt a user to provide a telephone number. In some embodiments, the GUI element 400 is displayed as part of a "sign in" or "sign up" prompt. A user may be prompted to provide an email address or telephone number outside the context of user authentication. For example, in some instances, a GUI element such as the GUI 400 may be displayed to encourage a user to sign up for a newsletter (and thus may not require a password in such an embodiment).

In some circumstances, a real email address or a real phone number is provided to the device 101 or host 161 manually. For example, an end-user may transmit an email to customer service, and the customer service representative may manually enter the user's real email or real phone number into a module that triggers the aliasing process.

II. Example Methods

Below, the example methods are described with reference to FIGS. 5-11. Depending on the embodiment, the aliases handled during any one or more of the methods 500-1100 described below may be addressable aliases for user telecom addresses (e.g., email addresses, phone numbers, etc.) or non-addressable aliases for any other suitable "real" information associated with a user (e.g., mailing addresses, names, social security numbers, passports etc.).

A. Alias Generation

Figure 5:
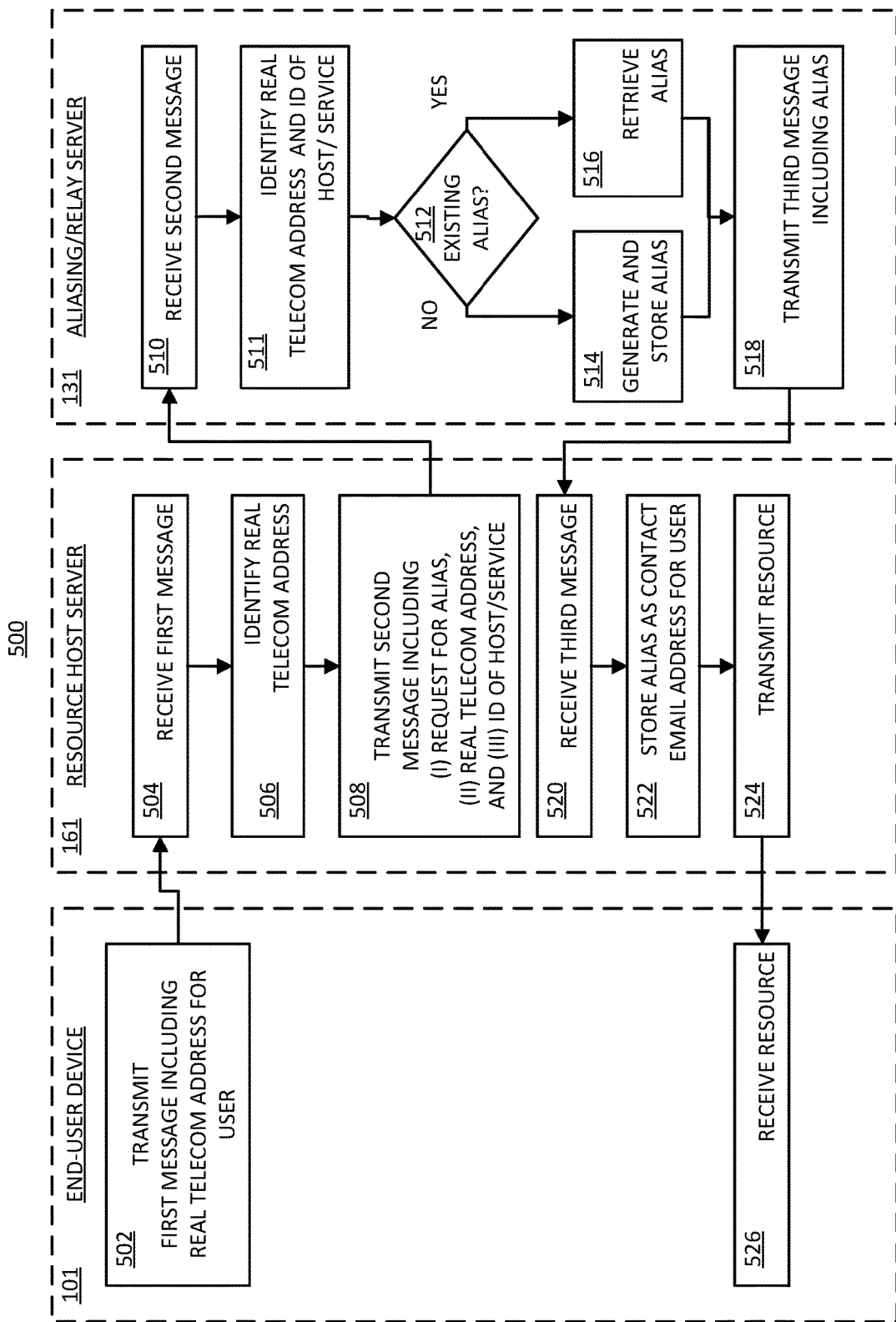
FIG. 5 is a swim-lane diagram of a method for generating alias telecom addresses for users.

FIG. 5 is a swim-lane diagram of a method 500 for generating alias telecom addresses for users. The method 500 may be implemented, in whole or in part, by the system 100 shown in FIG. 1. The method 500 may be saved to a memory as one or more instructions or routines, such as the routines 214, 244, or 274 saved to the memories 213, 243, and 273 shown in FIG. 2.

The method 500 begins at a step 502 in which the end-user device 101 transmits a first message including a real telecom address (e.g., alice@email.com or 324-197-2984) for a user. The step 502 may occur after a user interacts with a service provided by or associated with the host 161. For example, the user may want to access the resource 181 hosted by the host 161, and the host 161 may require the user to provide an email address or telephone number before accessing the resource 181. Accordingly, the host 161 may cause the device 101 to display a graphic element (e.g., the GUI 400 shown in FIG. 4) to prompt the user to provide an email address or phone number. The user may input her real email address or telephone number in a field of the graphic element. The device 101 may then generate and transmit to the host 161 the first message carrying the real telecom address (e.g., email address or phone number). The device 101 may encrypt the real address or the first message before transmission.

At a step 504, the host 161 receives the first message. In some instances, the first message may be received in multiple parts.

At a step 506, the host 161 decodes the first message to identify the real address included in the first message (e.g., alice@email.com). In an embodiment, the first message is encrypted and the host 161 decrypts the first message to identify the real address (e.g., utilizing a private or public key). In an embodiment, the first message or the real telecom address is encrypted as a code (i.e., an encrypted set of data) and the host 161 does not have access to a key capable of decrypting the code (e.g., the device 101 may have encrypted the real telecom address using a cipher to create the code).

At a step 508, the host 161 may initiate generation of a contact telecom address for the user that is distinct from the real telecom address. For example, the host 161 may encode and transmits a second message including (i) a request for an alias for the user; (ii) the real address for the user (or encrypted code created from the real address), and (iii) an identifier (ID) for the service associated with the host 161. The host 161 may encrypt the second message before transmission.

After transmitting the second message, the host 161 may avoid permanent storage of the real address (e.g., the host 161 may erase from memory all records of the real address). In some embodiments, the host 161 is configured to tunnel the first message or the real email address to the aliasing server 131. For example, the host 161 may implement software that prompts the user for the real address and that causes the end-user device 101 to establish a direct link with the aliasing server 131 for the purpose of transmitting the real address to the server 131.

At a step 510, the server 131 receives the second message. In some instances, the second message may be received in multiple parts. For example, in some embodiments, the real address is routed from the device 101 to the server 131 while bypassing the host 161 (e.g., the host 161 may facilitate the device 101 launching a portal, establishing such a route to the server 131, in which the user provides the real address). In such embodiments, the server 131 may receive the real address in a first part of the message that is part of a transmission distinct from a second part of the message including the request and host or service ID (i.e., the second part may be transmitted by the host 161 and the first part may be transmitted by the device 101).

At a step 511, the server 131 identifies the real address from the second message (which may involve decrypting the second message) as well as the ID unique to the service requesting the alias. As an example, the device 101 may have encrypted the real address using a cipher to create code. In some instances, the host 161 may not be capable of decrypting the code. However, the server 131 may access a key (for the same cipher used for encryption) to decrypt the code and thereby identify the real address. Advantageously, by encrypting the real address at the device 101 and only decrypting it at the server 131, the system 100 mitigates the potential negative impact of a middle main gaining access to the messages carrying the real address. Moreover, the entity controlling the server 161 may reduce its own exposure to liability and risk associated with handling sensitive data. By avoiding learning the real address, the entity controlling the server 161 cannot be held responsible for data breaches exposing sensitive information if it never gains access to the sensitive information.

At a step 512, the server 131 analyzes the map 132 to determine if an alias already exists for the real address and the requesting service. If no such alias exists, the method proceeds to step 514. Note, the map 132 may include an alias for the real address and a second service distinct from the requesting service. In such an example, the method still proceeds to step 514. In response to determining the map 132 includes a previously generated alias mapped to both the real address and the requesting service, the server 131 proceeds to step 516.

At a step 514, the server 131 generates a unique alias (e.g., the alias 146 or the alias 151 in FIG. 1) for the real address and requesting service. This may occur automatically utilizing a cryptographically secure random number/character generator. In an embodiment, the first part of an alias email address (i.e., the part preceding the "@" symbol) is 12 characters in length. The second part or the domain (i.e., following the "@" symbol) may be 10 to 28 characters in length. The server 131 then stores the alias (e.g., the alias 146 in FIG. 1) to the map 132 so that it is mapped to the real address (e.g., the real email 147 in FIG. 1). The server 131 may utilize tables and a relational schema such as that shown in FIG. 3 to link the generated alias with the real address and the requesting service.

At a step 516, the server 131 retrieves the existing alias that is mapped to the requesting service and the real address.

At a step 518, the server 131 transmits a third message carrying the generated or retrieved alias. The server 131 may encrypt the third message before transmission.

At a step 520, the host 161 receives the third message and identifies the alias from the third message (which may involve decrypting the third message).

At a step 522, the host 161 stores the alias to the memory 273 as a contact address for the user (e.g., in place of the real telecom address). The host 161 may store the alias as part of a user profile for the user. For example, the host 161 may store the received alias to the profile 171 as the alias variable value 176b or 177b (depending on whether the alias is an email address or a telephone number). After storing the alias to the memory 273, the host 161 (and one or more other devices or services associated with the host 161, such as those controlled by the entity controller the host 161) can contact the user without knowing or having access to the real address. That is, when a person or system associated with the host 161 wants to contact the user, they may use the alias to contact the user. For example, the host 161 may transmit an email, call, or text message to the alias. Because the alias is an address for the aliasing server 131, the aliasing server 131 receives the email, call, or text. In response to receiving the message, the server 131 identifies (e.g., via a lookup of the map 132) the real address associated with the alias. The server 131 then forwards the content of the email, call, or text to the real address (e.g., the user's real or primary email address or telephone number). Accordingly, the host 161 can email, call, or text the user with access to the user's real address. Further, the user realizes the benefits of having a randomly generated alias address for the service associated with the host 161 without having to go through the hassle of manually creating and maintain multiple addresses himself or herself.

Staying with the step 522, the host 161 may store the alias to memory with a password as a username/password pair for the user (e.g., the pair representing an authentication factor). The username, password, or pair may be encrypted. In the future, the user may authenticate herself to the host 161 by providing her real address and password. The host 161 may then communicate with the server 131 to retrieve the alias corresponding to the real address. The host 161 may then compare the received alias and password to the pair stored to memory (or compare a hash of the alias/password to a hash of the stored pair). If a match exists, the host 161 may authenticate the user. Otherwise, the authentication may fail.

At a step 524, the host 161 may authenticate the user after receiving the alias and may authorize access to one or more resources (e.g., the resource 181) associated with the service associated with the host 161. For example, the resource may be a web page, image, video, audio, etc., and the host 161 may transmit the resource to the end-user device 101. In some embodiments, an authorization operation may be implemented after authentication and before enabling access to resources. For example, the host 161 may store to memory a record of permissions for each user. Thus, after authenticating a particular user, the host 161 may analyze that user's profile (e.g., the profile 171), which may include a record of permissions for the user, to determine whether or not the user is permitted to access the requested resources.

At a step 526, the end-user device 101 receives the transmitted resource and makes it available to the user (e.g., by displaying a web page via the display 223).

For the encryption and decryption techniques described above, the aliasing system 100 may utilize asymmetric or symmetric cryptography techniques for the encryption. For symmetric cryptography, a single key is used to both encrypt and decrypt content. For example, the device 101, the server 131, or the host 161 may encrypt information (e.g., one of the messages) utilizing a particular key, and the other of the systems 101/131/161 may receive the encrypted message and decrypt the message using the same particular key (e.g., enabling the receiving device to identify the real address, the alias, or a hash of the real address or alias).

For asymmetric cryptography, two or more distinct keys may be used. In an embodiment, the aliasing system 100 may utilize public-key encryption techniques. For example, the end device 101 or the host 161 may utilize a first key (e.g., public) to encrypt content and the host 161 or the server 131 may utilize a second key (e.g., private) to decrypt the content. The first key (which may be referred to, e.g., as an "encryption key" and/or a "public key" in some instances) may be mapped (e.g., mathematically) to the second key (which may be referred to, e.g., as a "decryption key" and/or "private key" in some instances). The first key may be generated so that anything encrypted with the first key may only be decrypted with the second key. For example, the device 101, the server 131, or the host 161 may encrypt information (e.g., one of the messages) utilizing a first key, and the other of the systems 101/131/161 may receive the encrypted message and decrypt the message using the second key (e.g., enabling the receiving device to identify the real address, the alias, or a hash of the real address or alias).

B. Message Relaying via the Aliasing System

Figure 6:
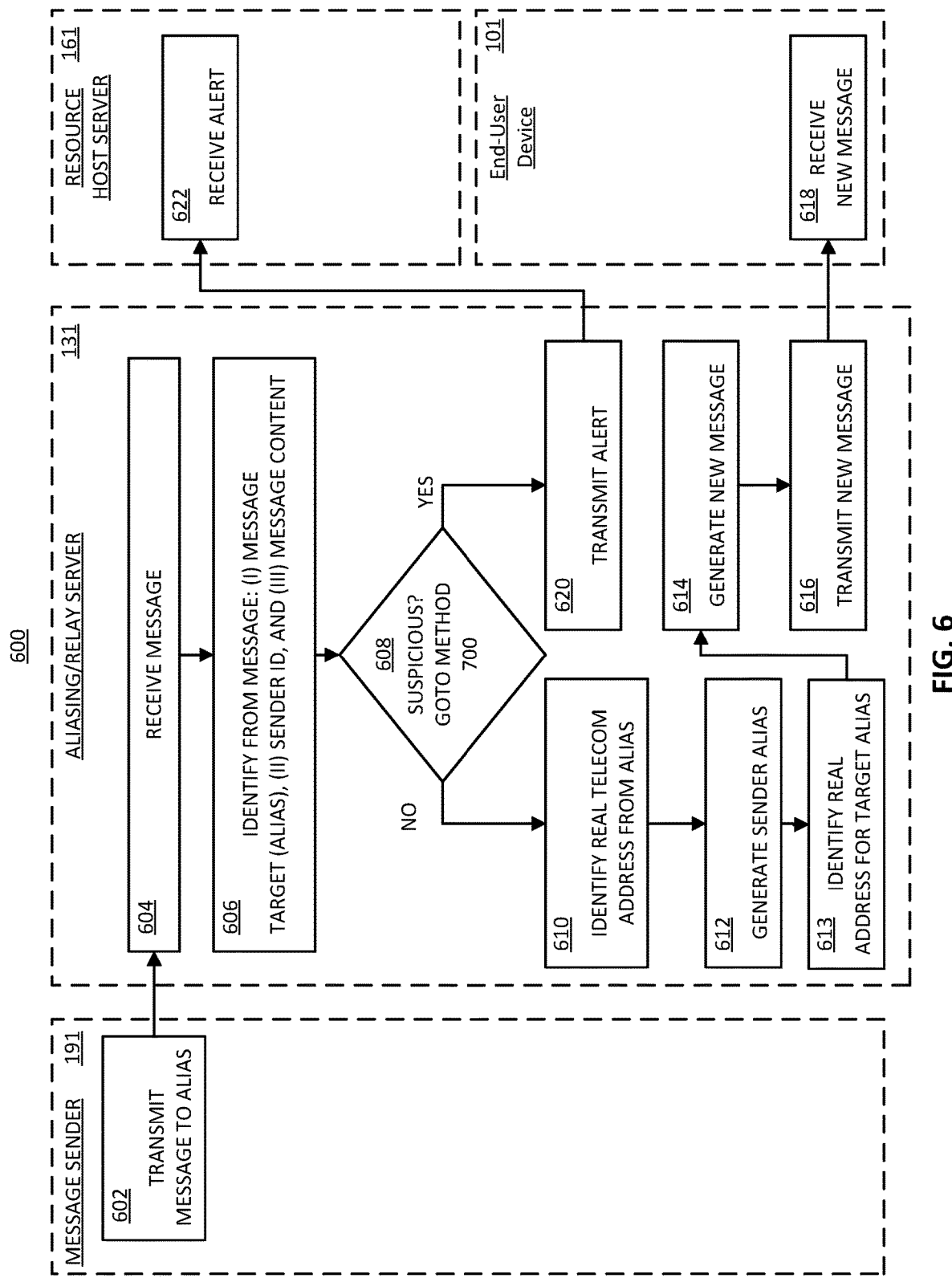
FIG. 6 is a swim-lane diagram of a method for relaying messages via the aliasing system.

FIG. 6 is a swim-lane diagram of a method 600 for relaying messages via the aliasing system 100. The method 600 may be implemented, in whole or in part, by the system 100 shown in FIG. 1. The method 600 may be saved to a memory as one or more instructions or routines, such as the routines 214, 244, or 274 saved to the memories 213, 243, and 273 shown in FIG. 2.

The method 600 begins when at a step 602, when the device 191 transmits a message to an alias. The message may be an email directed to the alias email address 146 or a phone call or text message to the alias phone number 151.

At a step 604, the server 131 receives the transmitted message via the network 199. When the message is an email, the network 199 may route the message to the server 131 based on the alias (e.g., the alias 146) being an address for the server 131.

When the received message is a phone call or text message, a signal representing the call may be routed through the telephone network 198. For example, the device 191 may originate a telephone call to the alias phone number 151, resulting in the device 191 transmitting a traditional telephony signal representing the call via the network 198 in an attempt to establish a phone call with the device(s) associated with the alias phone number 151. In such an example, the alias 151 may be assigned, by the network 198, to the gateway 195. Accordingly, the nodes of the network 198 (e.g., those for telephone exchanges and switching networks) may route the traditional telephony signal to the gateway 195. The gateway 195 receives the traditional telephony signal via an interface configured to: (i) link to traditional telephony networks that may be included in the network 198 (e.g., PSTN, cellular networks, satellite networks) and (ii) establish communication according to a first one or more typical telephony signaling protocols (e.g., SS7).

After receiving the traditional telephony signal, the gateway 195 decodes the traditional telephony signal according to the typical telephony signaling protocol(s) and then generates and encodes a data network call signal to carry data representing the call (identified by decoding the traditional telephony signal) according to one or more data networking protocols associated with the network 199 (e.g., the Internet protocol suite, voice over internet protocol suite or VOIP, etc.). The gateway 195 then transmits the data network call signal to the aliasing server 131 via the data network 199.

The "data network call signal" may be referred to as an "IP call" or a "VOIP call" in some instances, but the data network call signal may conform to protocols or standards other than traditional TCP/IP or VOIP protocols.

In some instances, the device 191 originates the data network call signal rather than originating the traditional telephony signal. For example, the device 191 may include software for establishing VOIP calls (e.g., Skype, Whatsapp, Google Voice, etc.). In such an example, the device 191 may bypass the network 198 and may transmit the message or signal to the server 131 via the network 199.

At a step 606, the server 131 decodes the message or signal to identify (i) the message target (i.e., the alias), (ii) an identifier for the sender (e.g., for the device 191 in this example), and (iii) the content of the message (e.g., the content in email body, the content in a text message). Note, when the message or signal is a phone call, the server 131 may not initially identify message content because the initial message or signal may be a signal for establishing a link that does not carry message content like an email or text message. However, after a phone call is established, the portion of the message or signal representing a caller's voice may be identified.

When the message is a phone call, the aliasing server 131 identifies the relevant data representing the phone call by decoding the data network call signal (e.g., transmitted by the gateway 195 or the device 191) according to the protocol(s) utilized to transmit the message.

Figure 7:
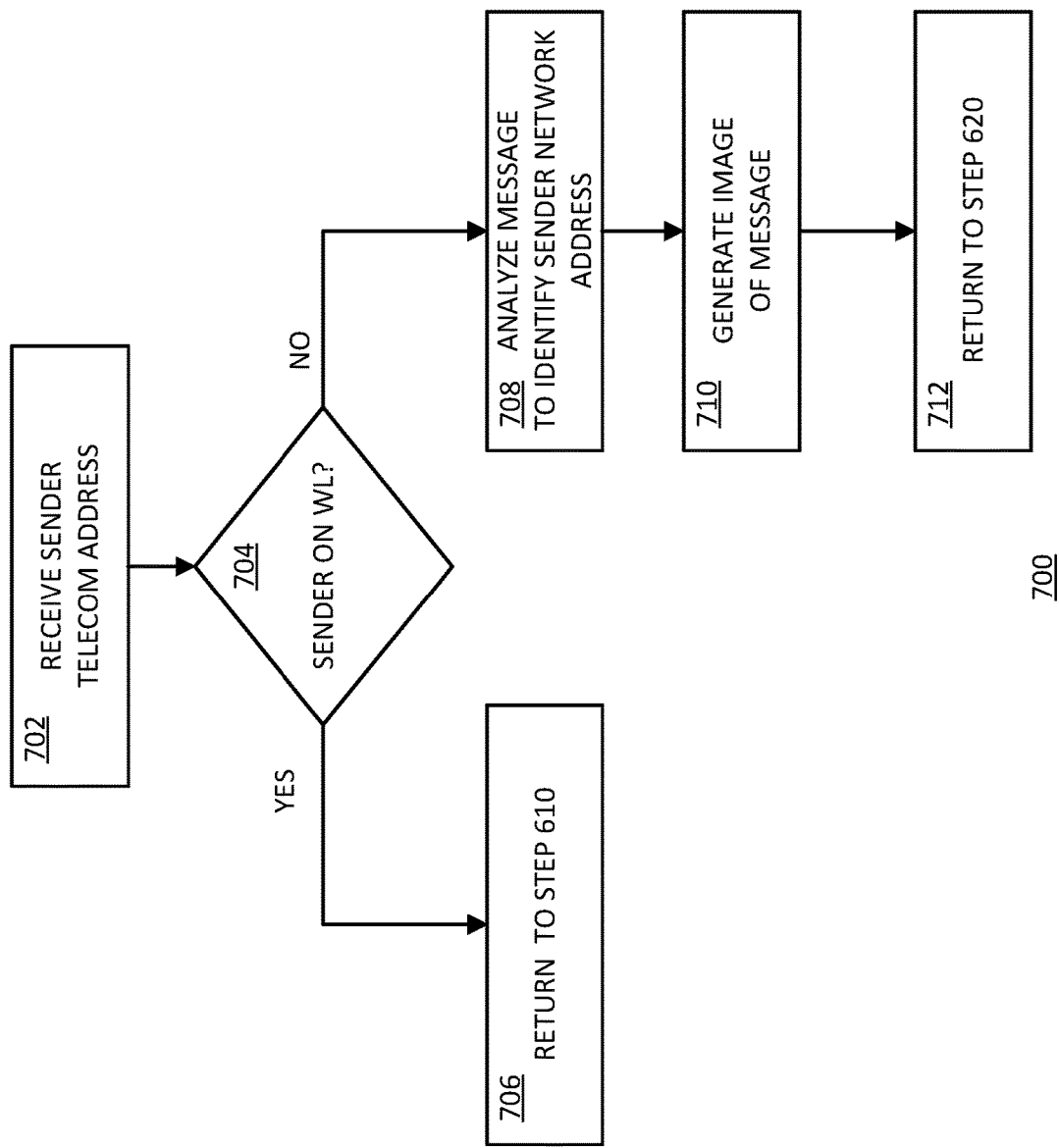
FIG. 7 is a flow chart of a method for identifying suspicious messages.

At a step 608, the server 131 determines whether the message is suspicious. FIG. 7 depicts an example method for making such a determination, and is described in further detail below. In response to determining the message is not suspicious, the server 131 continues to a step 610. In response to determining the message is suspicious, the server 131 continues to a step 620.

At the step 610, the server 131 identifies a real telecom address stored to the map 132 (e.g., the real email 147) that corresponds to the alias (e.g., the alias 146).

At a step 612, the server 131 generates a sender alias for the telecom address that originated the message. The server 131 may generate the sender alias in a manner like that described with reference to FIG. 5 to generate the alias for the user of the device 101.

At a step 613, the server 131 analyzes the map 132 to identify a real address (e.g., phone number or email address) mapped to the target alias.

At a step 614, the server 131 generates a new message (e.g., a new email, phone call, or text message) from the sender alias that is directed to the real address and that includes the content of the original message transmitted by the device 191. Note, if the message is a phone call and the call has not yet been established, the server 131 may first transmit a signal to the device 101 to establish a voice call before identifying and transmitting message content from the device 191 to the device 101.

Establishing the phone call may involve establishing a first telephone connection between the server 131 and the sending device 191 and establishing a second telephone connection between the end-user device 101 and the server 131. When both the first and second telephone connections are established, the server 131 may merge the first and second telephone connections to establish the phone call between the originating phone number (e.g., assigned to the originating device 191) and the first user phone number (e.g., assigned to the end-user device 101). In some instances, establishing the phone call involves encrypting voice data. For example, the server 131 may be configured to (i) forward, from the first user phone number to the originating phone number, first encrypted code representing audio transmitted from the first user phone number; and (ii) forward, from the originating phone number to the first user phone number, second encrypted code representing audio transmitted from the originating phone number.

At a step 616, the server 131 transmits the new message to the device 101.

At a step 618, the device 101 receives the message.

As previously noted, at the step 608, the server 131 determines whether or not the message from the device 191 is suspicious. If the message is suspicious, the server 131 generates and transmits an alert at step 620. The alert may be an email alert, a text message alert, or a phone call alert. As an example, the alert may including information identifying the sender's identity (e.g., an IP or MAC address of the device 191, the originating phone number or email address from the device 191, etc.), the message content, or both. In an embodiment, the alert includes a picture of this information (e.g., the picture may be a jpg, bmp, pdf, png, etc.). In an embodiment, the alert includes text representing the sender's identity (e.g., telecom address) or the message content (e.g., text message content or email message content).

In some instances, an alert similar to that discussed regarding step 622 is generated and transmitted to a user's real telecom address mapped to the alias to notify the user that an unauthorized sender attempted to call, text, or email his or her alias.

At a step 622, the host 161 receives the alert.

C. Identifying Suspicious Messages Via the Aliasing System

FIG. 7 is a flow chart of a method 700 for identifying suspicious messages. The method 700 may be implemented, in whole or in part, by the aliasing system 100 shown in FIG. 1 and, in particular, by the server 131. The method 700 may be saved to a memory as one or more instructions or routines, such as the routines 214, 244, or 274 saved to the memories 213, 243, and 273 shown in FIG. 2. The method 700 may be embodied by a module or routine, or a part of a module or routine, and may be called by the method 600 (e.g., at the step 608).

The method 700 begins at a step 702 when the server 131 receives a telecom address of a sender of the message in question. For example, staying with the example described with reference to FIG. 6, the server 131 may identify the telecom address (e.g., phone number or email address) used by the device 191 to send the message received at the server 131. To illustrate, the message may be an email originating from john@domain.com At a step 704, the server 131 analyzes the whitelist 134 to determine if the sender's telecom address (e.g., john@email.com) is included in the whitelist 134. In response to determining that the sender's telecom address is included in the whitelist 134, the server 131 proceeds to a step 706.

At a step 706, the server 131 returns to the step 610 of the method 600. At that point, the method 600 may proceed with forwarding the message content to the real address mapped to the alias to which the message was directed.

On the other hand, in response to determining the sender's telecom address is not included in the whitelist 134, the server 131 may analyze the message to identify a network address (e.g., IP address) associated with the device used by the sender (e.g., the device 191). In some instances, the server 131 may identify a MAC address of the sending device. In an embodiment, the whitelist 134 simply specifies a particular domain or subdomain.

At a step 710, the server 131 generates an image of one or more of: the message content, the sender's network address, or the sender's telecom address.

At a step 712, the server 131 returns to the step 620 of the method 600 to, e.g., generate an alert including the generated image.

In an embodiment, the server 131 may implement other techniques to identify suspicious methods. For example, the aliasing server 131 may analyze messages to determine that 95% of received messages originate from the US. If the aliasing server 131 suddenly starts receiving messages from China, this may trigger a low level alert.

D. User Authentication Via the Aliasing System

Figure 8A:
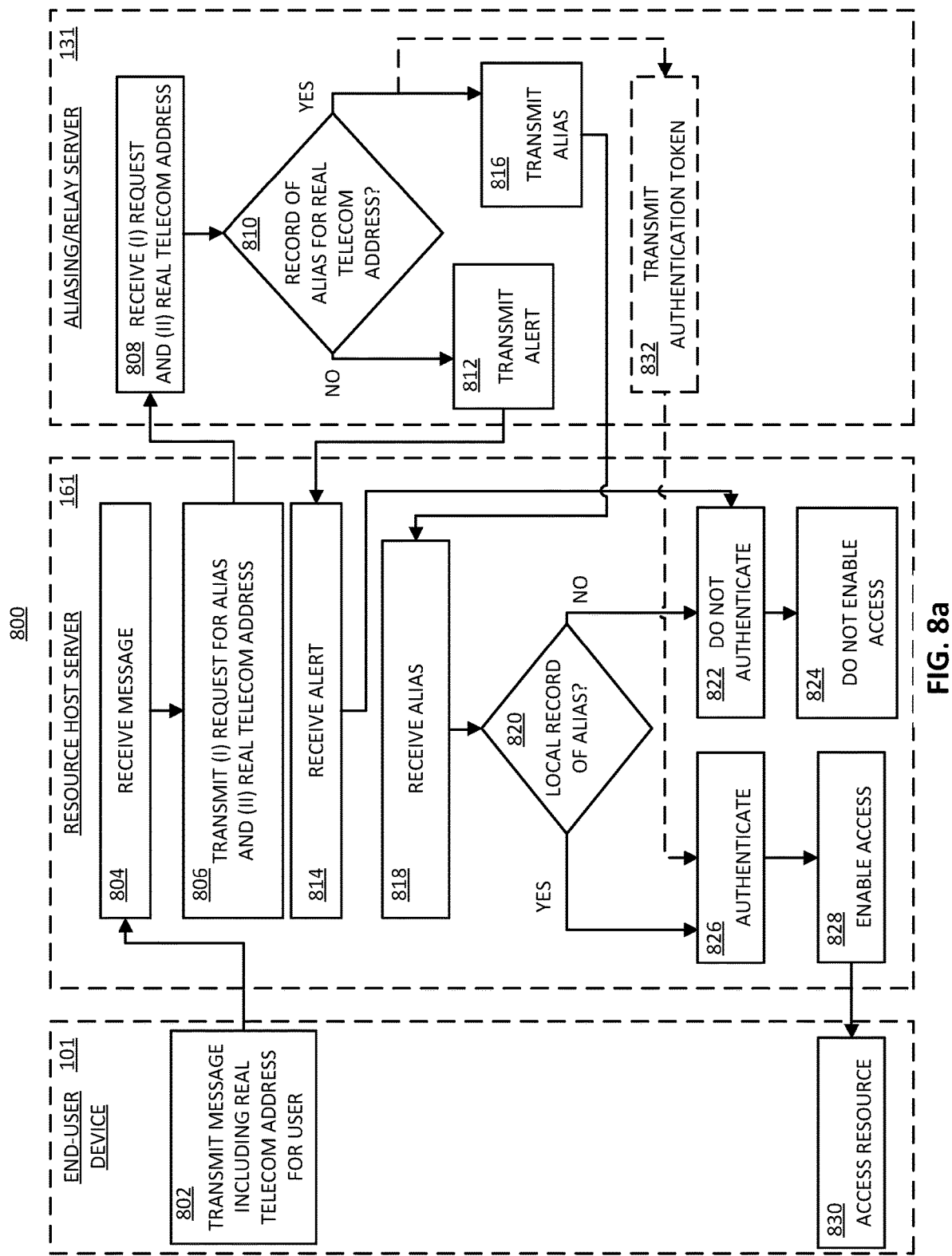
FIG. 8A is a swim lane diagram of a method for authenticating a user via the aliasing system.

FIG. 8A is a swim lane diagram of a method 800 for authenticating a user via the aliasing system 100. The method 800 may be implemented, in whole or in part, by the system 100 shown in FIG. 1. The method 800 may be saved to a memory as one or more instructions or routines, such as the routines 214, 244, or 274 saved to the memories 213, 243, and 273 shown in FIG. 2. The description below elaborates on the concept of user authentication before turning to the steps of the method 800.

Generally speaking, authentication is the process of determining whether someone or something is, in fact, who or what it declares itself to be. Authentication technology provides access control for systems by checking to see if a user's credentials match the credentials in a database or record of authorized users or in a data authentication server.

Users may be identified with a user ID (e.g., an email address or telephone number), and authentication may be accomplished when the user provides a credential (e.g., a password) that matches with that user ID. Most users are most familiar with using a password, which, as a piece of information that should be known only to the user, is called a knowledge authentication factor.

Authentication can be important because it enables organizations to keep their networks secure by permitting only authenticated users (or processes) to access its protected resources, which may include computer systems, networks, databases, websites and other network-based applications or services.

Once authenticated, a user or process is usually subjected to an authorization process as well, to determine whether the authenticated entity should be permitted access to a protected resource or system. A user may be authenticated but fail to be given access to a resource if that user was not granted permission to access it.

The terms authentication and authorization are often used interchangeably. But while they may be implemented together, the two functions are distinct. Authentication is the process of validating the identity of a registered user before allowing access to the protected resource; authorization is the process of validating that the authenticated user has been granted permission to access the requested resources. The process by which access to those resources is restricted to a certain number of users is called access control. The authentication process typically occurs before the authorization process.

Regarding implementing user authentication, user authentication generally occurs within most human-to-computer interactions outside of guest accounts, automatically logged-in accounts, and kiosk computer systems. Generally, a user chooses a username or user ID (e.g., email address) and provide a valid password to begin using a system. User authentication may authorize human-to-machine interactions in operating systems and applications, as well as both wired and wireless networks to enable access to networked and internet-connected systems, applications and resources.

Companies may use the disclosed authentication techniques to validate users who log into their websites. Without sufficient security measures, user data, such as credit and debit card numbers, as well as Social Security numbers, could get into the hands of cybercriminals. Organizations may also use the disclosed authentication techniques to control which users have access to corporate networks and resources, as well as to identify and control which machines and servers have access. Companies may also use the disclosed authentication techniques to enable remote employees to securely access their applications and networks. For enterprises and other large organizations, the disclosed authentication techniques may be implemented using a single sign-on (SSO) system, which grants access to multiple systems with a single set of login credentials.

Staying with FIG. 8A, the method 800 begins at a step 802, when the device 101 transmits a message including a telecom address (e.g., email address or phone number). The message may also include a password. Generally speaking, the telecom address and password are provided by a user of the end-user device 101.

At a step 804, the host 161 receives the message and decodes the message to identify a first telecom address.

At a step 806, the host 161 then transmits a second message including (i) a request for an alias or an indication of a successful match for the first telecom address (i.e., an indication that the alias map 132 at the server 131 includes the first telecom address and that a mapped alias exists for the first telecom address), (ii) the first telecom address, and (iii) an identifier for the host 161 or a service associated with the host 161. In an embodiment, the host 161 encrypts the message before transmission. In an embodiment, the second message does not include the identifier for the host 161 or associated service.

At a step 808, the server 131 receives the second message and decodes the second message to identify the request and the first telecom address. In an embodiment, decoding the second message involves decrypting the second message. In some instances, the server 131 may check the map 132 to determine whether or not the telecom address it received from the host 161 is an existing alias. If the received address is not an existing alias, the method may proceed to a step 810. If the received address is an existing alias, the server 131 may implement the method 850 shown in FIG. 8b.

At a step 810, the server 131 analyzes the map 132 to determine if it includes an alias mapped to the first telecom address and to the host 161 or to the service associated with the host 161. In response to determining such an alias does not exist in the map 132, the server 131 proceeds to a step 812. In response to determining the map 132 includes an alias mapped to the first telecom address, the server 131 proceeds to a step 816 (or a step 832 in some embodiments).

When an alias does not exist, at the step 812 the server 131 generates and transmits an alert to the host 161. The alert may include an indication that an authentication failed, and it may include (i) the real telecom address from the device 101, (ii) a network address (e.g., IP address) or hardware address (e.g., MAC address) of the device 101, and (iii) any other relevant information (e.g., does the real telecom address have an alias for another site?).

At a step 814, the host 161 receives the alert that the authentication failed.

At the step 816, when the server 131 identifies an alias at the step 810, the server 131 then transmits the identified alias to the host 161 (or a hash of the identified alias).

At a step 818, the host 161 receives the identified alias (or corresponding hash). The alias or hash may be encrypted and transmitted in a message by the server 131. In such an example, the host 161 may decrypt the message to identify the alias or hash.

At a step 820, the host 161 analyzes a local record (e.g., the user profiles 162 stored to the memory 273) to determine if the alias or hash from the server 131 matches an alias stored to the local record (e.g., the alias 176) (or matches a hash stored to the local record). When a matching alias does not exist, the host 161 proceeds to a step 222. When a matching alias does not exist, the host 161 proceeds to a step 826.

The step 820 may further include the host 161 comparing additional candidate authentication credentials to stored authentication credentials. For example, the host 161 may receive a password from the end-user device 101 along with the first telecom address. During the step 820, the host 161 may compare an alias/password combination or a hash/password combination to a stored alias/password or hash/password combination. Note, such examples may be unique in that host 161 receives the candidate authentication credentials from two different devices: the device 101 and the server 131. By contrast, in typical authentication systems (e.g., an authentication server), all relevant candidate authentication credentials are received from an end-user device similar to the device 101.

At the step 822, after determining that the received alias or hash does not match an alias or hash stored to memory, the host 161 determines that the user associated with the device 101 (and with the alias received from the server 131) is not authenticated. In some instances, a data integrity check may be initiated so that steps can be taken to address a mismatch between the local alias record maintained by the host 161 and the alias map 132 maintained by the server 131 (because, theoretically, any alias maintained at one of the servers 131 or 161 should also exist at the other).

At a step 824, the host 161 denies the device 101 access to the resource 181 in response to the user authentication failing.

At the step 826, in response to the host 161 identifying a local alias matching the alias received from the server 131 at the step 820, the host 161 authenticates the user of the device 101, (e.g., by setting an internal flag or variable indicating that the user is authenticated).

At a step 828, in response to the user authentication succeeding, the host 161 enables the device 101 to access the resource 181. In some embodiments, the host 161 may implement an authorization step before determining whether access should be abled. For example, it is possible that a user successfully verifies he is who he claims to be, but may not have the proper permissions to access the resource 181. For example, the user may attempt to access "premium content" on a movie streaming service, but he may only have a standard subscription that does not permit him to access the premium content.

At a step 830, the end-user device 101 accesses the resource 181. As described previously with reference to FIG. 1, accessing the resource 181 may include accessing a file, a document, an image, a video, audio, or a web service (e.g., accessing a cloud storage service, accessing a social media service, accessing a retail or shopping service, accessing a news or sports service, accessing a financial service such as a credit card or bank account, etc.).

At a step 832, in some embodiments, the server 131 may transmit an authentication token to the host 161 after verifying that the record 131 includes an alias mapped to the real telecom address and the service associated with the host 161. The token, or a message including the token, may identify the user to indicate that an alias exists for that user (e.g., by transmitting back to the host 161 the real address or a unique identifier otherwise associated with a corresponding user profile).

The server 131 may implement the step 832 instead of or in addition to the step 816. In an embodiment, the host 161 receives the authentication token and, in response, proceeds to the step 826 to authenticate the user. In such an example, the host 161 may complete an authentication operation by confirming that a password from the user matches a stored password. That is, in such an example, the host 161 may not need to also confirm that an alias for the real address matches a known alias stored to memory because, by way of receiving the authentication token, the host 161 can confirm that the real telecom address matches an existing telecom address stored to the map 132.

In some embodiments, the step 816 is implemented by transmitting a first hash of the identified alias instead of transmitting the alias. The first hash may be generated in real-time or may be identified from the hash record 136 (e.g., where it was stored after generation at a previous time). In such embodiments, implementing the step 818 involves the host 161 receiving the first hash. Further, in such embodiments, the step 820 involves utilizing the same hash function (i.e., the same hash function utilized by the server 131 to generate the first hash) to generate (e.g., and store at a local hash record—not shown) one or more hashes for one or more locally stored aliases (e.g., the aliases 176b, 177b) to determine if the generated one or more hashes includes a hash matching the first hash. If the local hashes include a match to the first hash, the host 161 proceeds to the step 826 for user authentication. If the local hashes do not include a match, the host 161 proceeds to the step 822 to deny user authentication.

Note, during authentication, a first set of credentials provided by the user are compared to a second set of credentials on file in a database of authorized users' information either on the local operating system or through an authentication server (e.g., at the user profiles 162 stored to the memory 273). If the first and second sets of credentials match, and the authenticated entity is permitted to use the resource, the process is completed and the user is granted access. The permissions and folders returned define both the environment the user sees and the way he can interact with it, including hours of access and other rights such as the amount of resource storage space.

The system 100 may implement traditional authentication techniques, in which authentication is accomplished by the systems or resources being accessed; for example, a server (e.g., the server 161) may authenticate users using its own password system, implemented locally, using login IDs (user names, email addresses) and passwords. Knowledge of the login credentials may be assumed to guarantee that the user is authentic. Each user registers initially (or is registered by someone else, such as a systems administrator), using an assigned or self-declared password. If desired, on each subsequent use, the user must know and use the previously declared password.

However, the web's application protocols, HTTP and HTTPS, are stateless, meaning that strict authentication may require end users reauthenticate each time they access a resource using HTTPS. Rather than burden end users with that process for each interaction over the web, the system 100 may rely on token-based authentication, in which authentication is performed once at the start of a session. The authenticating system (e.g., the host 161) may issue a signed authentication token to the end-user application, and that token is appended to every request from the client.

Handling an Unauthorized Authentication Attempt

Figure 8B:
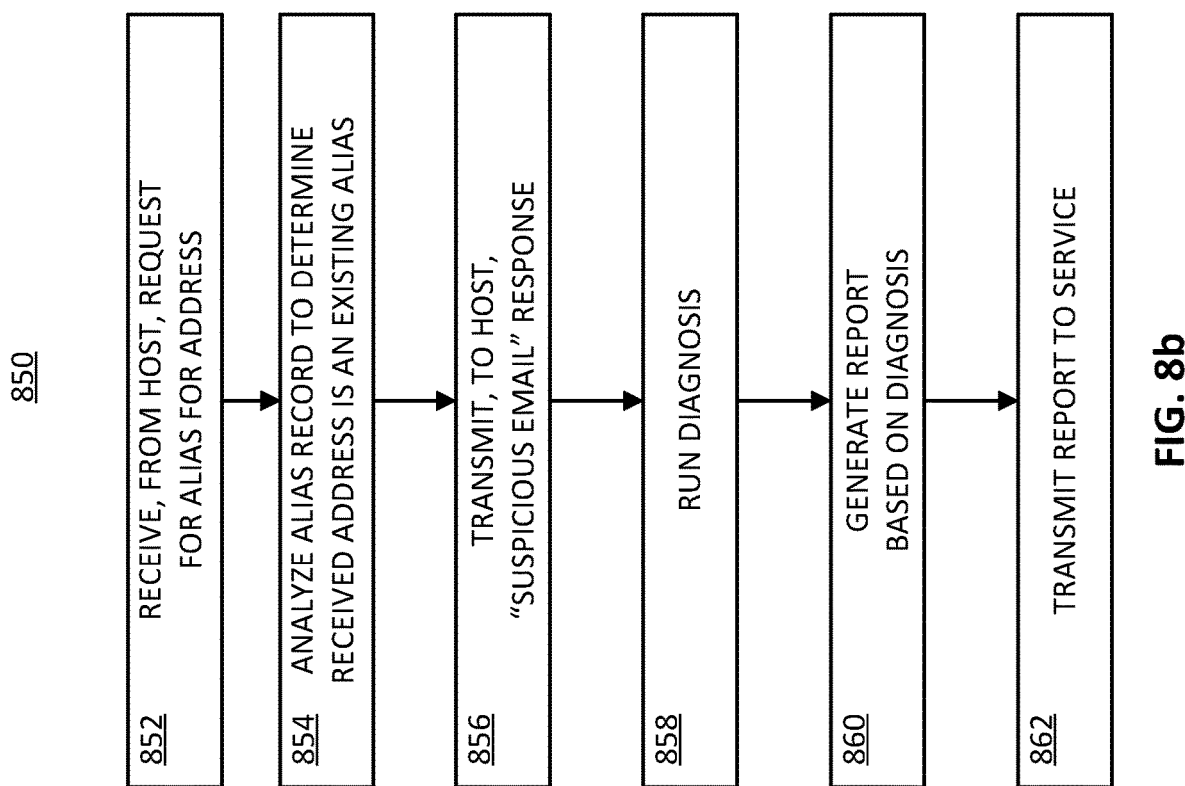
FIG. 8B is a flow chart of a method for handling an unauthorized authentication attempt via the aliasing system.

FIG. 8B is a flow chart of a method 850 for handling an unauthorized authentication attempt via the aliasing system 100. The method 850 may be implemented, in whole or in part, by the system 100 shown in FIG. 1. The method 850 may be saved to a memory as one or more instructions or routines, such as the routines 214, 244, or 274 saved to the memories 213, 243, and 273 shown in FIG. 2.

The method 850 begins at a step 852 when the server 131 receives, from the host 161, a request for an alias for an existing alias. For example, the server 131 may receive a message similar to that discussed regarding step 808 of the method 800. However, instead of the message including (i) a request for an alias and (ii) a real telecom address, the message may include (i) a request for an alias and (ii) an existing alias. For example, a user may have provided the existing alias at step 802 instead of a real telecom address, and the host 161 may have passed the existing alias along with the request for the alias.

At a step 854, the server 131 analyzes the map 132 to determine whether or not the received address is an existing alias. When the received address is not an existing alias, the server 131 may proceed with processing the message (e.g., by implementing step 810 of the method 800). When the received address is an existing alias, the method 850 continues to step 856.

At the step 856, the server 131 transmits a "suspicious email" response to the host 161. This response may include any suitable variable or indication indicating that a user attempted to sign-in or authenticate himself or herself by providing an alias (e.g., rather than a real address). The host 161 may receive the response, and may respond by initiating an "authentication error" sequence. For example, the host 161 may transmit a message to the device 101 that causes the device 101 to display a message indicating that the authentication, sign-up, or sign-in failed.

At a step 858, the server 131 may implement a diagnosis to generate diagnostics. For example, the diagnostics may include an IP or MAC address of the end-user device that originally provided the existing alias in the authentication attempted. This diagnosis may reveal whether or not an attempted "credential stuffing" attack was attempted. A "credential stuffing" attack is a type of brute force attack in which large numbers of spilled (i.e., breached) credentials are automatically entered into websites until they are potentially matched to an existing account, which the attacker can then hijack for their own purposes.

At a step 860, the server 131 generates a report including the diagnostics. The report may take any suitable form. For example, it may include text, a pdf file, an image file, etc.

At a step 862, the server 131 transmits the report to the service associated with the host 161. The report may be transmitted via email or text message. In some instances, the server 131 notifies the service that the report is available, and someone associated with the service may have to log-on to a website associated with the server 131 to access the report.

F. Data Integrity Checks for the Aliasing System

Figure 9:
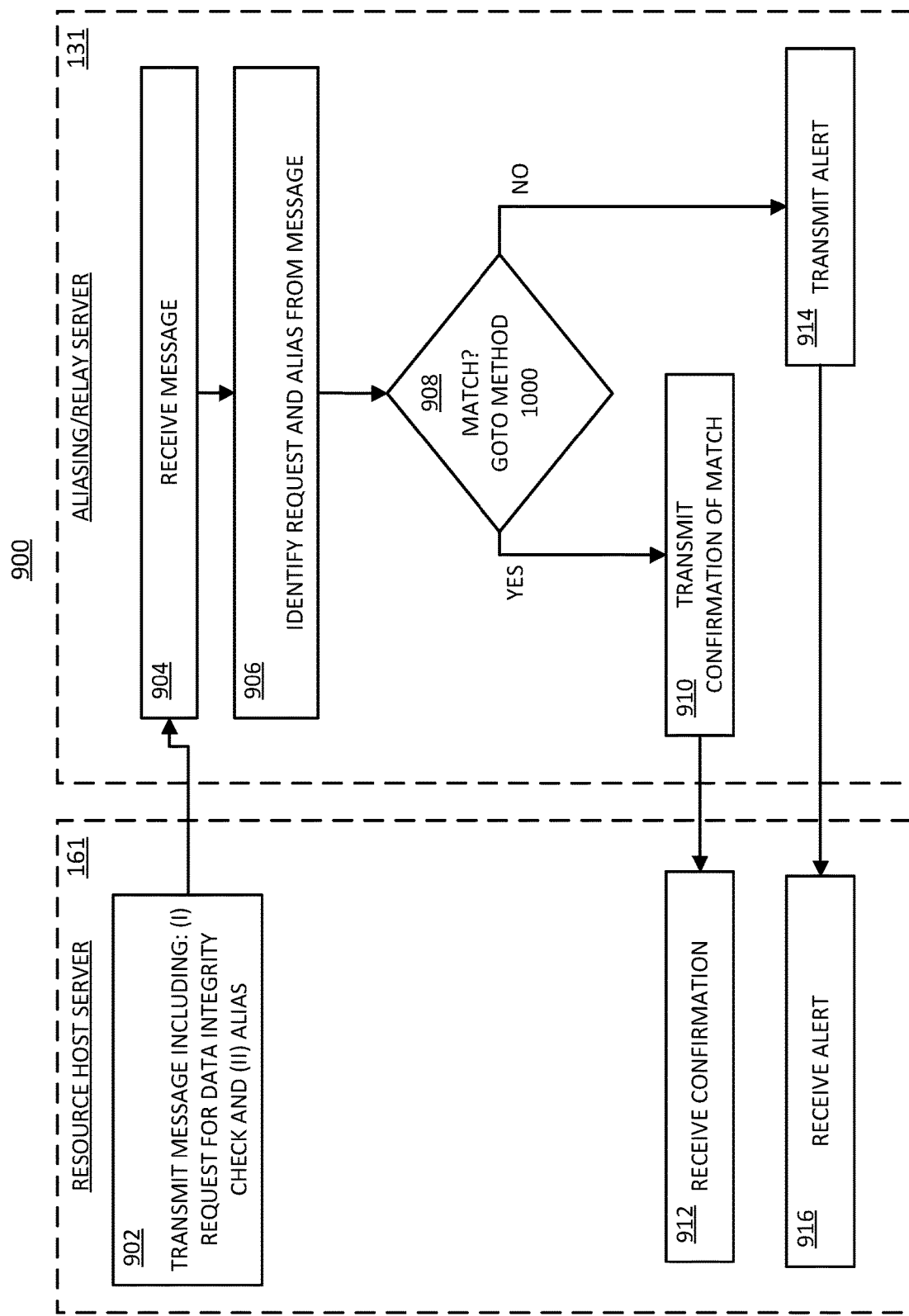
FIG. 9 is a swim lane diagram of a method for performing a data integrity check for aliases maintained by the aliasing system.

FIG. 9 is a swim lane diagram of a method 900 for performing a data integrity check for aliases maintained by the aliasing system 100. The method 900 may be implemented, in whole or in part, by the system 100 shown in FIG. 1. The method 900 may be saved to a memory as one or more instructions or routines, such as the routines 244 or 274 saved to the memories 243 and 273 shown in FIG. 2. Depending on the embodiment, the aliases checked during the data integrity check may be addressable aliases for user telecom addresses (e.g., email addresses, phone numbers, etc.) or non-addressable aliases for any other suitable "real" information associated with a user (e.g., mailing addresses, names, social security numbers, passports etc.).

The method 900 begins at a step 902, when the host 161 transmits a message including (i) a request for a data integrity check and (ii) a local alias (e.g., the aliases 176b or 177b) maintained by the host 161 to be the subject of the data integrity check. In an embodiment, the host 161 encrypts the message according to any suitable encryption protocol. In an embodiment, the host 161 may transmit multiple aliases for a data integrity check.

Staying with the step 902, in some embodiments, the host 161 transmits the actual aliases in question. In some embodiments, the host 161 transmits an identifier or token corresponding to the aliases in question. For example, the host 161 may implement a hash function utilizing the alias 176b as a key to generate a first hash. The host 161 may then transmit the first hash to the host 131 instead of transmitting the actual alias.

Advantageously, by transmitting hashes back and forth between the host 161 and the server 131, the system 100 avoids a middle man "intercepting" one of the aliases during transmission. Because one or more links, networks, or nodes (e.g., routers, gateways, etc.) may exist between the server 131 and the host 161, a bad actor may implement a packet sniffer at one of the intermediary nodes between the servers 131 and 161 in an attempt to identify sensitive information transmitted between the two, such as an alias. In some embodiments, the system 100 addresses this potential problem by avoiding transmitting aliases and by transmitting hashes instead.

Returning to FIG. 9, at a step 904, the server 131 receives the message transmitted by the host 161 (e.g., via the communication interface 233).

At a step 906, the server 131 decodes the message to identify the request and local alias or hash included in the message. This step may involve decrypting the message.

At a step 908, the server 131 analyzes the map 132 to determine if it includes an alias or hash matching the received alias or hash local to the host 161. For example, the server 131 may implement the method shown in FIG. 10 to determine whether or not a match exists (described in more detail below). If a match exists, the server 131 proceeds to a step 910. If a match does not exist, the server 131 proceeds to a step 914.

At the step 910, in response to determining a match exists at the step 908, the server 131 transmits to the host 161 a message including a confirmation (e.g., a binary flag) of a successful match.

At a step 912, the host 161 receives the message including the confirmation of the successful integrity check. The host 161 may create a local record indicating that the local alias was verified as accurate and synced to the alias map 132 of the server 131 (e.g., the local record may include a timestamp associated with the verification to keep track of dates/times of verification and gaps between verifications).

In some embodiments, the host 161 may reset a timer that periodically triggers initiation of the method 900.

At the step 914, in response to determining a match does not exist at the step 908, the server 131 generates and transmits an alert. The alert may be a message including an indication (e.g., a binary flag) of an unsuccessful match.

At the step 916, the host 161 receives the alert. In response to receiving the alert, the host 161 may initiate a data cycling method such as that shown in FIG. 11. In some embodiments, the server 131 may initiate the data cycling method in response determining a match does not exist at step 908. In some instances, the alert may be forwarded and provided via a user interface device of one of the servers 131 or 161 (e.g., one of the displays 251 or 281) to notify a user of the failed integrity check (e.g., a worker or agent of the service associated with the host 161 or the service associated with the aliasing server 131). More generally, the host 161 may generate and display (e.g., via the display 283) a report indicating that a local alias at the host 161 is no longer valid. This report may be a text document, an email, a text message, etc.

In some embodiments, the method 900 may be implemented as a batch integrity check. For example, the host 161 may initiate an integrity check for every single local alias it has on record. In some embodiments, the host 161 initiates integrity checks for selected local aliases based on random or individual schedules (e.g., spot checks, checks based on age of alias, etc.).

Figure 10:
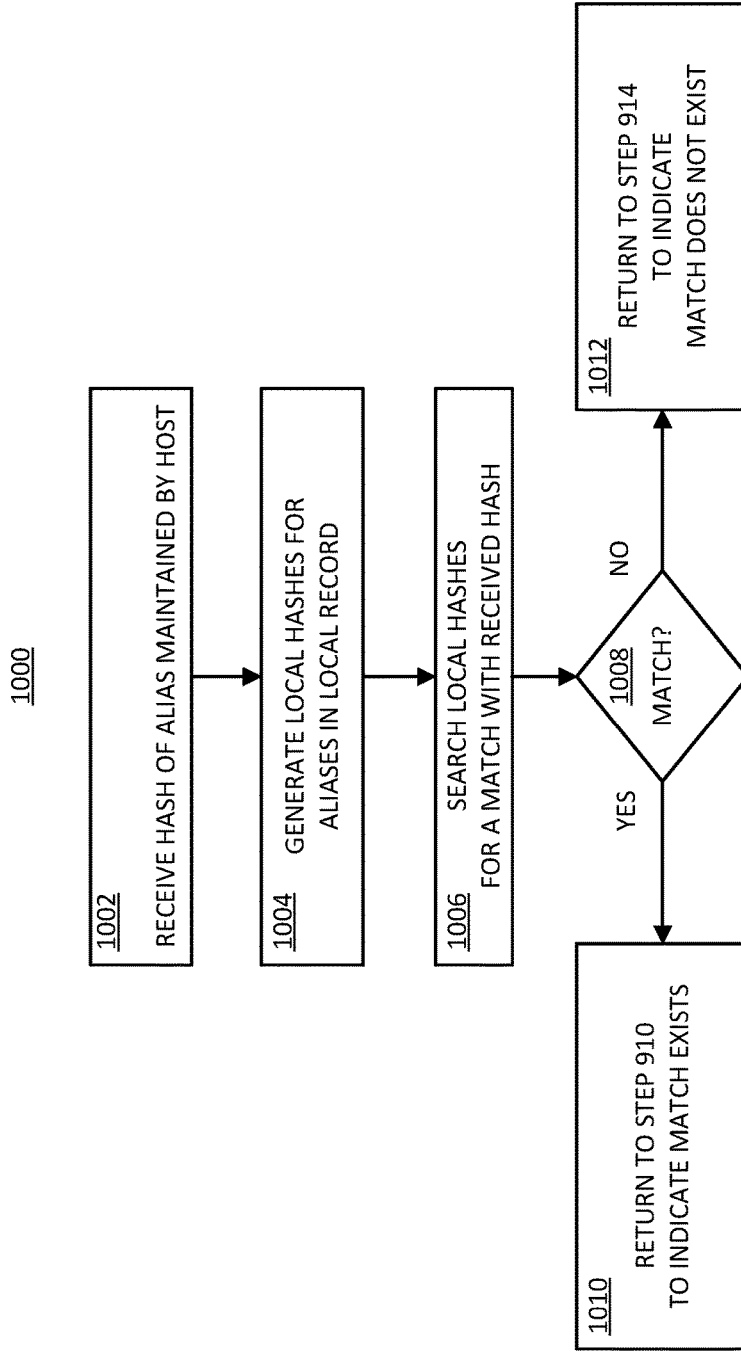
FIG. 10 is a flow chart of a method for determining whether an alias match exists between systems.

FIG. 10 is a flow chart of a method 1000 for determining whether an alias match exists between systems. The method 100 may be implemented, in whole or in part, by the system 100 shown in FIG. 1. The method 1000 may be saved to a memory as one or more instructions or routines, such as the routines 244 or 274 saved to the memories 243 and 273 shown in FIG. 2.

The method 1000 begins at a step 1002, when the server 131 receives a first hash generated by the host 161 based on a first alias maintained by the host 161. In some instances, the first hash is sent in conjunction with an indicator or ID of the host 161 or of a service associated with the host 161 (e.g., the first hash and ID may be included in the same message). The host ID may be helpful because the server 131 may be implemented to work with the multiple hosts and associated servers.

At a step 1004, the server 131 generates a second hash (or "local hash") for one or more local hashes (e.g., generates the hashes maintained in the map 132). In some instances, the step 1004 is implemented before the step 1002. For example, when an alias is initially created and added to the maps 132, a corresponding may also be created and added to the hash record 136.

At a step 1006, the server 131 searches the local hashes (e.g., those in the map 132) to determine if the local hashes include a hash matching the first hash.

At a step 1008, the server 131 determines if a match exist based on the search performed in the step 1006. If a match does not exist, the server 131 proceeds to a step 1012 where it returns to the step 914 of the method 900 to indicate a match does not exist. If a match does exist, the server 131 returns to the step 910 of the method 900 to indicate a match does exist.

It will be understood that, while the description above references the host 161, any one of the hosts 160 may generate and transmit to the server 131 a hash similar to the first hash for the purpose of performing a data integrity check.

G. Data Cycling in the Aliasing System

Figure 11:
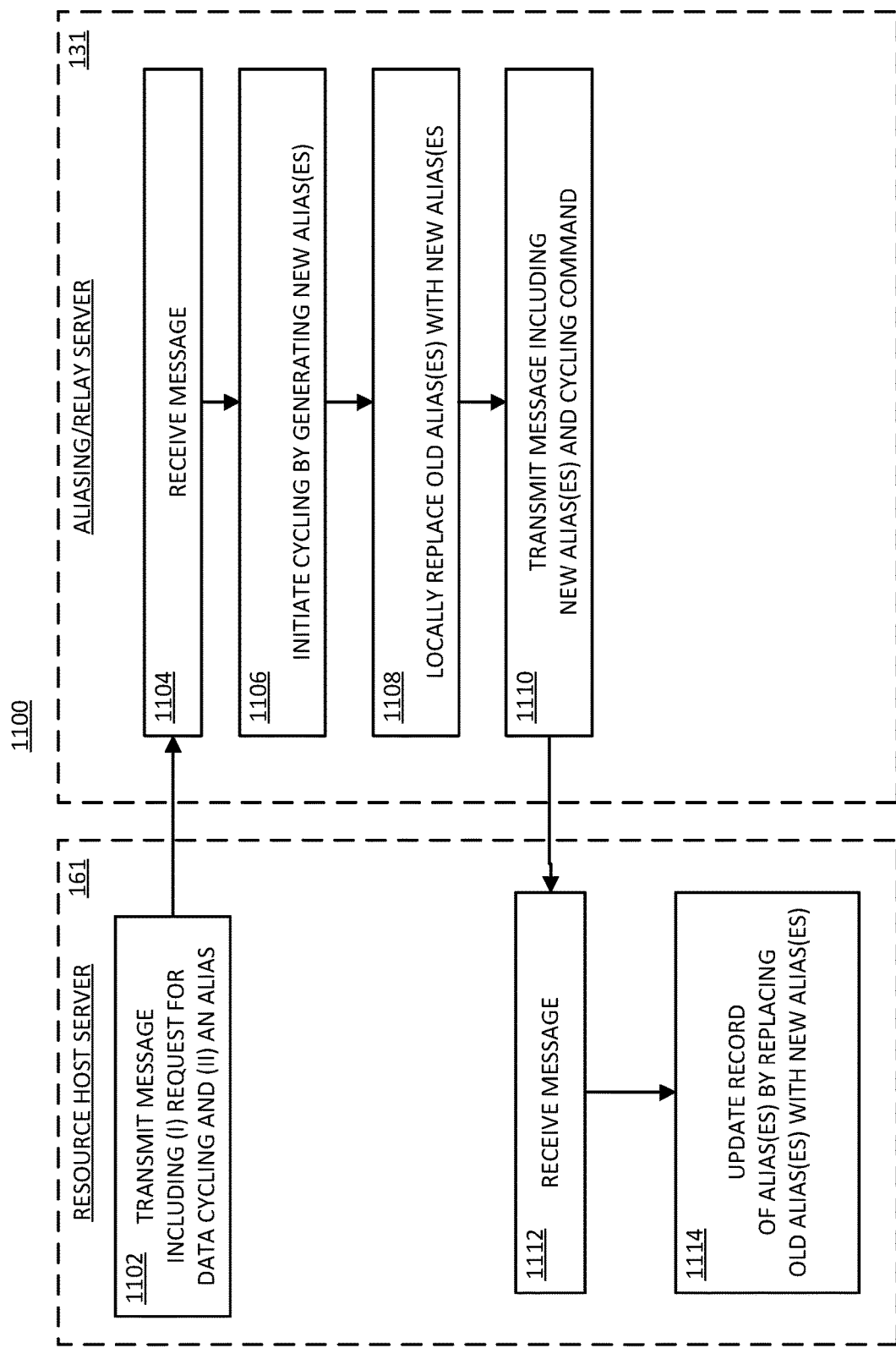
FIG. 11 is a swim lane diagram of a method for cycling aliases.

FIG. 11 is a swim lane diagram of a method 1100 for cycling aliases. The method 1100 may be implemented, in whole or in part, by the aliasing system 100 shown in FIG. 1. The method 1100 may be saved to a memory as one or more instructions or routines, such as the routines 244 or 274 saved to the memories 243 and 273 shown in FIG. 2. Generally speaking, the method 1100 enables the host 131 and the server 161 to refresh a set of aliases for a set of user telecom addresses in a coordinated manner. While the method 1100 is described with respect to replacing a single first alias with a single new alias, it will be appreciated that the data cycling operation may be implemented to refresh multiple aliases in the local alias record of the host 161 and the alias map 132 of the server 131. For example, the host 161 may initiate the data cycling operation to refresh every alias in a local alias record. Depending on the embodiment, the aliases refreshed during the data cycling operation may be addressable aliases for user telecom addresses (e.g., email addresses, phone numbers, etc.) or non-addressable aliases for any other suitable "real" information associated with a user (e.g., mailing addresses, names, social security numbers, passports etc.).

The method 1100 begins at a step 1102, when the host 161 transmits a message including a request for data cycling and a first one or more aliases maintained at the host 161. In some embodiments, the method 1100 does not include the step 1102. That is, the data cycling may be initiated by the server 131 if desired. In some instances, the server 131 or the host 161 triggers the data cycling in response to receiving trigger. The trigger may be scheduled to automatically refresh one or more aliases on a periodic schedule. The schedule may be consistent (e.g., every two weeks), random (e.g., unpredictable data cycling), or semi-random (e.g., once every 4-8 weeks).

At a step 1104, the server 131 receives the message and decodes the message to identify the data cycling request and the first one or more aliases. In some embodiments, decoding the message involves decrypting the message. In an embodiment, the server 131 may identify a one or more hashes of the first alias (instead of the first one or more aliases) from the message. In such an example, the server 131 can identify the aliases in the alias map that have hashes matching those received from the host 161.

At a step 1106, the server 131 initiates cycling by generating a new alias.

At a step 1108, the server 131 locally stores (within the map 132) the new alias such that it replaces the first alias in the map 132 and such that the new alias is mapped to the real address that was mapped to the first alias.

At a step 1110, the server 131 encodes a message with the new alias and a cycling command. The server 131 then transmits the message. The server 131 may encrypt the message before transmission. The message may be transmitted via a stream. That is, it will be understood that references herein to "messages" or "messaging" may refer to communications via framed messages (e.g., packets) conforming with a frame-based or packet-based protocol, as well as communications via an unframed stream of data conforming with a stream-based protocol. The data representing a particular a message within a stream may be referred to as a message. A single stream may transport a stream of data representing multiple messages in some instances. In embodiments utilizing streams, the host 161 and the server 131 may each utilize stream handlers for encoding or formatting data and messages for a stream and for decoding or reading the data and messages.

At a step 1112, the host 161 receives the 1112 and decodes the message to identify the new alias and the cycling command. Decoding the message may involve decrypting the message. In an embodiment, the received message includes the new alias but does not include the user telecom address mapped to the new alias. Indeed, the host 161 may have no way of determining which alias corresponds to which alias. Advantageously, this lack of information regarding a mapping between new aliases and user telecom addresses may shield the service associated with the host 161 from responsibility or potential liability for safeguarding the user telecom addresses.

At a step 1114, the host 161 responds to the cycling command by updating a local record of the first alias so that the first alias is replaced with the new alias (e.g., at one of the user profiles 162).

III. Additional Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the methods 500-1100 specifically, the described functions may be implemented, in whole or in part, by the devices, circuits, or routines of the system 100 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present invention has been described with reference to specific examples, which are intended to be illustrative only and not to be limiting of the invention, it will be apparent to those of ordinary skill in the art that changes, certain additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

IV. General Terms and Phrases

Throughout this specification, some of the following terms and phrases are used.

Application. See "Routine."

Application Programming Interface (API). The system 100 may be implemented using APIs. For example, the server 131 may include an API enabling one or more of the hosts 160 to communicate with the server 131 to initiate alias generation, alias relaying, data cycling, data integrity checking, etc. Similarly, the host 161 may include an API that the end-user device relies on to communicate with the host 161.

Generally speaking, an API is a set of defined methods of communication among various software components implemented on one or more computers. An API may be thought of as an interface for a server or service that any other entity can interact with as long as it knows the rules (e.g., protocols or standards) for interacting with the API. Said another way, an API may be thought of as the code governing the access point for the server or service An API may include definitions defining a set of subroutines, communication protocols, and tools for building software compatible with other software components adhering to the same API. Typically, an API is related to a "software library," wherein the API describes and prescribes a set of rules and "expected behavior" (e.g., via an API specification) and the library represents an "actual implementation" of the rules API definition, specification, and documentation Cloud/Cloud Computing. In some instances, one or more components of the system 100 shown in FIG. 1 may be implemented using cloud computing services. The phrase "cloud computing" generally refers to a variety of concepts involving a large number of computers connected through a network (e.g., the Internet). In common usage, "the cloud" is often a metaphor for the Internet. "In the cloud" often refers to software, platforms, and infrastructure sold "as a service" (i.e., remotely through the Internet). The supplier of these services generally utilizes servers hosting products and services from a remote location, enabling individual users to access these products and services via the servers while requiring the users to install little if any software on their end-user devices. Example models of cloud computing services may be referred to as "software as a service," "platform as a service," and "infrastructure as a service." Cloud services may be offered in a public, private, or hybrid networks and may be implemented on hosts provided by third-party cloud vendors. In some instances, one or more components of the system 100 shown in FIG. 1 may be implemented using cloud computing services.

Communication Interface. Some of the described devices or systems in the system 100 include a "communication interface" (sometimes referred to as a "network interface"). For example, each of the described communication interfaces 203, 233, and 263 shown in FIG. 2 enables the system of which it is a party to (i) send information or data to other systems or components or (ii) receive information or data from other systems or components. Each described communication interface may be configured to enable the system of which it is a party to couple to a peripheral device (e.g., a keyboard, a monitor, an external hard drive, etc.), may be referred to as being or including a "peripheral interface" or an "I/O interface" (see "I/O interface"). For example, the UI components 205, 235, and 265 may be coupled to the communication interfaces 203, 2333, and 263, respectively. In some instances, one or more of the described communication interfaces may be utilized to establish a direct connection to another system. In some instances, one or more of the described communication interfaces enable the system(s) of which they are a part to connect via a link to a network (e.g., a personal area network (PAN), a local area network (LAN), or a wide area network (WAN)).

If desired, each described communication interface 203/233/263 may include (i) circuitry that enables connection to a wired link that carries electrical or optical signals to another device (e.g., via a coax cable or fiber optic cable) and to communicate with that other device, or (ii) circuitry that enables wireless communication (e.g., short-range or long-range communication) via electromagnetic signals, such as radio frequency (RF) signals. Further, in some embodiments, any one or more of the communication interfaces 203/233/263 may include multiple interfaces for communicating with components or systems external to the system of which they are a part. For example, in some instances, a described communication interface may refer to a set of communication interfaces including: one or more wired communication interfaces, one or more wireless communication interfaces, and one or more I/O or peripheral interfaces. The described communication interfaces 203/233/263 and corresponding systems may conform to any one or more suitable communications protocols, standards, or technologies, such as those described herein.

Communication Protocols. In this description, communication protocols, standards, and technologies may be referred to generically as "communication protocols." Example communication protocols, standards, or technologies that may be utilized by the system 100 include those that facilitate communication via nanoscale networks, near-field networks, personal area networks ("PANs"), local area networks ("LANs"), backbone networks, metropolitan area networks ("MANs"), wide area networks ("WANs"), Internet area networks ("IANs"), or the Internet.

Example near-field network protocols and standards that may be utilized by the system 100 in some embodiments for communication between components include typical radio-frequency identification ("RFID") standards or protocols and near-field communication ("NFC") protocols or standards. Example PAN protocols and standards that may be utilized by the system 100 in some embodiments for communication between components include 6LoWPAN, Bluetooth™ (i.e., a wireless standard for exchanging data between two devices using radio waves in the range of approximately 2.4 to 2.485 GHz), IEEE 802.15.4-2006, ZigBee, the Thread protocol, ultra-wideband ("UWB"), universal serial bus ("USB") and wireless USB, and ANT$_+$. Example LAN protocols and standards that may be utilized by the system 100 in some embodiments for communication between components include the 802.11 protocol and other high frequency protocols/systems for wireless communication in bands found in a range of approximately 1 GHz-60 GHz (e.g., including the 900 MHz, 2.4 GHz, 3.6 GHz, 5 GHz, or 60 GHz bands), as well as standards for suitable cabling such as coaxial and fiber-optic cabling. Example technologies that may be used by the system 100 in some embodiments to facilitate wireless WANs includes those used for LANs, as well as 2G (e.g., GPRS and EDGE), 3G (e.g., UMTS and CDMA2000), 4G (e.g., LTE and WiMax), and 5G (e.g., IMT-2020) technologies. Note, the Internet may be considered a WAN.

Other communication protocols and standards that may be utilized by the system 100 in some embodiments include BitTorrent, Bluetooth Bootstrap Protocol ("BOOTP"), Domain Name System ("DNS"), Dynamic Host Configuration Protocol ("DHCP"), Ethernet, file transfer protocol ("FTP"), hypertext transfer protocol ("HTTP"), infrared communication standards (e.g., IrDA or IrSimple), transmission control protocol/internet protocol ("TCP/IP") (e.g., any of the protocols used in each of the TCP/IP layers), real-time transport protocol ("RTP"), real-time streaming protocol ("RTSP"), Simple Mail Transfer Protocol ("SMTP"), Simple Network Management Protocol ("SNMP"), Simple Network Time Protocol ("SNIP"), secure shell protocol ("SSH"), and any other communications protocol or standard, or any combination thereof.

Communication Link. Unless otherwise stated, a "communication link" or a "link" is a pathway or medium connecting two or more nodes. A link may be a physical link or a logical link. A physical link is the interface or medium(s) over which information is transferred, and may be wired or wireless in nature. Example physicals links include (i) wired links such as cables with a conductor for transmission of electrical energy or a fiber optic connections for transmission of light and (ii) wireless links such as wireless electromagnetic signals that carry information via changes made to one or more properties of electromagnetic waves.

As noted, a wireless link may be a wireless electromagnetic signal that carries information via changes made to one or more properties of an electromagnetic wave(s). A wireless electromagnetic signal may be a microwave or radio wave and may be referred to as a radio frequency or "RF" signal.

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Computer. Generally speaking, a computer or computing device is a programmable machine having two principal characteristics. Namely, it responds to a set of instructions in a well-defined manner and can execute a prerecorded list of instructions (e.g., a program or routine). A computer according to the present disclosure is a device with a processor and a memory. For purposes of this disclosure, examples of a computer include a server host, a personal computer, (e.g., desktop computer, laptop computer, netbook), a mobile communications device (such as a mobile "smart" phone), and devices providing functionality through internal components or connection to an external computer, server, or global communications network (such as the Internet) to take direction from or engage in processes which are then delivered to other system components.

Display Device. Generally speaking, the terms "display device" or "display" refer to an electronic visual display device that provides visual output in the form of images, text, or video. Typically, a display device may be any display, screen, monitor, or projector suitable for displaying visual output (e.g., images or video output). Example displays include LED screens, LCD screens, CRT screens, projectors, heads up displays, smart watch displays, headset displays (e.g., VR goggles), etc.

Graphic User Interface (GUI). See "User Interface."

Input/Output (I/O) Interface. Generally speaking, an I/O interface of a computer system is a hardware component (e.g., an I/O controller installed on a motherboard) that communicatively connects one or more processors of the computer system to one or more input or output devices such as UI device or peripheral devices. For example, each of the communication interfaces 203, 233, and 263 shown in FIG. 2 may include an I/O interface (not shown) for coupling the UI components 205, 235, and 265 to the systems 101, 131, and 161.

Memory and Computer-Readable Media. Generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Message. When used in the context of communication networks, the term "message" refers to a unit of communication, represented by a set of data, transmitted or received by a node (e.g., via a link). The set of data representing the message may include a payload (i.e., the content intended to be delivered) and protocol overhead. The overhead may include routing information and metadata pertaining to the protocol and/or payload (e.g., identifying the protocol for the message, the intended recipient node, the originating node, the size of the message and/or payload, data integrity information for checking the integrity of the message, etc.). In some instances, a packet or sequence of packets may be thought of as a message. In some instances, the term "message" refers to a logically connected set of data that is not necessarily part of the same transmission or data set.

Module. When used in the context of a software system, the term "module" generally refers to a set of applications, routines, or executable instructions. See "Routine." In some instances, the term "module" refers to a component of a physical system (e.g., a car includes a number of modules, such as an engine, transmission, brakes, etc.). The context of the use of the term will make clear whether the "module" refers to a software component or non-software component.

Network. As used herein and unless otherwise specified, when used in the context of system(s) or device(s) that communicate information or data, the term "network" refers to a collection of nodes (e.g., devices or systems capable of sending, receiving or forwarding information) and links which are connected to enable telecommunication between the nodes.

A network may include dedicated routers, switches, or hubs responsible for forwarding directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. A network may include networks or sub-networks, such as a local area network (LAN) or a wide area network (WAN).

Node. Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor. The various operations of example methods described herein may be performed, at least partially, by one or more processors such as the processors 211, 241, and 271 shown in FIG. 2. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Routine. Unless otherwise noted, a "routine," "module," or "application" described in this disclosure refers to a set of computer-readable instructions that may be stored on a CRM. For example the routines 214, 244, and 274 shown in FIG. 2 are routines stored on a CRM. Generally, a CRM stores computer-readable code ("code") representing or corresponding to the instructions, and the code is adapted to be executed by a processor to facilitate the functions described as being represented by or associated with the routine or application. Each routine or application may be implemented via a stand-alone executable file, a suite or bundle of executable files, one or more non-executable files utilized by an executable file or program, or some combination thereof. In some instances, unless otherwise stated, one or more of the described routines may be hard-coded into one or more EPROMs, EEPROMs, application specific integrated circuits (ASICs), field programmable gate arrays (FPGAs), or any other hardware or firmware elements.

Further, unless otherwise stated, each routine or application may be embodied as: (i) a stand-alone software program, (ii) a module or sub-module of a software program, (iii) a routine or sub-routine of a software program, or (iv) a resource invoked or accessed by a software program via a "call" to thereby cause the system to implement the task or function associated with the resource. The call may be (i) a "function call" that is invoked to cause execution of a resource (e.g., set of instructions) stored at a library accessible by the software program; (ii) a "system call" that is invoked to cause execution of a system resource (e.g., often running in privileged kernel space and only executable only by the operating system); (iii) a "remote call" that is invoked to cause a logical or physical entity with a different address space to execute a resource; or (iv) some combination thereof. As an example, a routine executed by a processor of a device may invoke a "remote call" to cause execution of a resource at (i) a second device (e.g., a server host, an end-user device, a networking device, a peripheral device in communication with the device, or some other physical device); (ii) a virtual-machine on the same or different device; (iii) a processor (e.g., CPU or GPU) that is different from the original processor and that may be internal or external to the device executing the routine; or (iv) some combination thereof.

Each routine may be represented by code implemented in any desired language, such as source code (e.g., interpretable for execution or compilable into a lower level code), object code, bytecode, machine code, microcode, or the like. The code may be written in any suitable programming or scripting language (e.g., C, C++, Java, Actionscript, Objective-C, Javascript, CSS, Python, XML, Swift, Ruby, Elixir, Rust, Scala, or others).

Server. Generally speaking, a server is a program or set of routines that manages network resources or services to provide functionality for other programs or devices called "clients." Servers are typically hosted by a host computer, and this host computer may itself be referred to as a "server." Example servers include database servers, file servers, mail servers, print servers, web servers, game servers, and application servers. Servers may be dedicated (e.g., wherein the software and hardware are used exclusively or nearly exclusively for server functions) or virtual (e.g., wherein the server is hosted by a virtual machine on a physical machine and/or wherein the server shares hardware or software resources of a single machine with another operating system).

Software Development Kit (SDK). Generally speaking, the term "SDK" (sometimes called a "devkit") refers to a set of tools, libraries, relevant documentation, code samples, processes, and or guides that allow developers to create software applications on a specific platform. While an API may be thought of as an interface for a service or server that any other entity can interact with as long as it knows the rules for interacting with the API, an SDK may be thought of as a full set of tool that can be used to develop software applications targeting a specific platform.

User Interface (UI). Generally speaking, a user interface refers to the components of a computer system by which a user and the computer system interact. The UI components may be hardware, software, or some combination thereof, and may include UI input components, UI output components, or some combination thereof. The described UI components include the UI components 205, 235, and 265 shown in FIG. 2.

Example UI output components (e.g., the components 221, 251, 281 shown in FIG. 2) include: (i) visual output components such as lights (e.g., LEDs) and electronic displays (e.g., LCD, LED, CRT, plasma, projection displays, heads-up displays, etc.), (ii) audio output components such as speakers, and (iii) motion generating components such as motors that provide haptic feedback.

Example UI input components (e.g., the components 225, 255, 285 shown in FIG. 2) include: (i) mechanical or electrical components for detecting physical or touch input, such as hardware actuators (e.g., those used for a keyboard, a mouse, "hard" buttons found on a tablet or phone, etc.) or electrical sensors (e.g., resistive or capacitive touch sensors); (ii) audio sensors (e.g., microphones) for detecting audio input, such as voice commands; (iii) image sensors for detecting image or video input, such as those found in a camera (e.g., enabling facial recognition input or gesture input without requiring the user to touch the device); and (iv) motion sensors (e.g., accelerometers, gyroscopes, etc.) for detecting motion of the computer system itself (e.g., enabling a user to provide input by rotating or otherwise moving the computer system).

Some systems provide a graphical user interface (GUI) by way of a UI output component such as an electronic display (e.g., the display 223 of the device 101). Generally speaking, a GUI is generated via a routine and enables a user to interact with indicators and other graphic elements displayed at the electronic display. Generally speaking, the graphic elements of a GUI may be output elements (i.e., conveying some sort of information to the user), control elements (i.e., being user "interactable" to cause the execution of an action by the system), or both (e.g., an icon may include an image representing a browser and may be interacted with to launch the browser).

Example GUI control elements include buttons (e.g., radio buttons, check boxes, etc.), sliders, list boxes, spinner elements, drop-down lists, menus, menu bars, toolbars, interactive icons, text boxes, windows that can be moved or minimized and maximized, etc.

What is claimed is:

1. An aliasing system for implementing alias telephone numbers, the aliasing system comprising: (a) an aliasing server having a first one or more hardware processors configured to store an alias map including one or more alias phone numbers for one or more user phone numbers; and (b) a resource server having a second one or more hardware processors configured to: receive, from an end-user device, a first message including a particular phone number for a user; and request generation of an alias for the particular phone number by generating and transmitting a second message including: (i) the particular phone number; (ii) an identifier for a service associated with the resource server; and (iii) a request for an alias for the particular phone number; (c) wherein the first one or more hardware processors of the aliasing server are further configured to: receive the second message; respond to receiving the second message by generating and storing to the alias map an alias phone number such that the alias phone number is: (i) unique relative to each of the other one or more alias phone numbers stored to the alias map; (ii) mapped, within the alias map, to both (A) the service associated with the resource server, and (B) the particular phone number; and (iii) associated with the aliasing server such that phone calls or text messages to the alias phone number are received at the aliasing server and forwarded to the particular phone number; and transmit a third message including the alias phone number; (d) wherein the second one or more hardware processors of the resource server are further configured to: receive the third message and identify the alias phone number from the third message; and store the alias phone number as a contact phone number for the user so that when the contact phone number is utilized, phone calls or text messages to the end-user device are enabled without storing the particular phone number at the resource server and without addressing the phone calls or text messages to the particular phone number.

2. The system of claim 1, further comprising:
a gateway communicatively coupled to the aliasing server, wherein the gateway is assigned the alias phone number and is configured to:
(i) receive, via a telephone network, telephone calls directed to the alias phone number;
(ii) decode, according to a first one or more protocols associated with the telephone network, the telephone calls;
(iii) encode, according to a second one or more protocols associated with a data network, one or more messages including data representing the telephone calls; and
(iv) transmit, via a data network, one or more messages including data representing the telephone calls according to a second one or more protocols associated with the data network.

3. The system of claim 1, wherein the first message is for authenticating the user and further includes a password;
wherein the resource server is further configured to store the alias phone number as a username with the password as a username/password pair.

4. The system of claim 1, wherein the first message is for authenticating the user and further includes an email address and a password;
wherein the resource server is further configured to:
(i) request and receive an alias email address for the email address; and
(ii) store the alias phone number to a user profile including the alias email address and the password as a username/password pair.

5. The system of claim 1, wherein the aliasing server is further configured to encrypt the alias phone number in an encrypted message before transmitting it to the resource server; and wherein the resource server is further configured to decrypt the encrypted message to identify the alias phone number.

6. The system of claim 1, wherein aliasing server is further configured to forward telephone calls directed to the alias phone number to the particular phone number only when the telephone calls originate from an originating phone number that is included on a whitelist stored to the aliasing server.

7. The system of claim 1, wherein the particular phone number is an encrypted phone number that is encrypted according to a cipher for which (i) the resource server does not possess a key capable of decrypting the encrypted particular phone number, and (ii) the aliasing server possesses a key capable of decrypting the encrypted phone number to identify the particular phone number; and
wherein the aliasing server is further configured to decrypt the encrypted phone number to identify the particular phone number.

8. The system of claim 1, wherein the service is a first service; wherein the resource server is a first resource server configured to provide the first service; and
wherein the system further includes a second resource server configured to provide a second service, the second resource server configured to:
receive, from the end-user device, a fourth message including the particular phone number for the user; and
request generation of an alias, distinct from the particular phone number, for the user by generating and transmitting a fifth message including: (i) the particular phone number; (ii) an identifier for the second service; and (iii) a request for the alias for the particular phone number; and
wherein the aliasing server is further configured to:
receive the fifth message; and
respond to receiving the fifth message by generating and storing to the alias map a second alias phone number such that the second alias phone number is: (i) unique relative to each of the other one or more alias phone numbers stored to the alias map; (ii) mapped, within the alias map, to both (A) the second service associated with the first resource server, and (B) the particular phone number; and (iii) functional as an address for the aliasing server so that emails addressed to the second alias phone number are received at the aliasing server and forwarded to the particular phone number.

9. A method for implementing alias emails, the method comprising:
implementing, at an aliasing server, an alias map stored to a memory that includes one or more alias phone numbers for one or more user phone numbers;
receiving, at the aliasing server, a message from a resource server;
decoding, at the aliasing server, the message to identify:
(i) a particular phone number assigned to an end-user device; (ii) an identifier for a service associated with the resource server; and (iii) a request for an alias for the particular phone number;
causing the aliasing server to respond to the request by:
generating and storing to the alias map an alias phone number such that the alias phone number is (i) unique relative to each of the other one or more alias phone numbers stored to the alias map; (ii) mapped, within the alias map, to both (A) the service associated with the server, and (B) the particular phone number; and (iii) associated with the aliasing server such that phone calls to the alias phone number are received at the aliasing server and forwarded to the particular phone number; and
transmitting the alias phone number from the aliasing server to the resource server for storage as a contact phone number for the user so that when the contact phone number is utilized, phone calls or text messages to the end-user device are enabled without storing the particular phone number at the resource server and without addressing the phone calls or text messages to the particular phone number.

10. The method of claim 9, wherein the alias phone number is a first alias phone number and wherein the method further comprises:
receiving, at the aliasing server, a request to establish a telephone connection that is (i) from an originating phone number assigned to an originating device, and (ii) addressed to the first alias phone number;
analyzing the alias map to identify the particular phone number mapped to the first alias phone number;
generating a second alias phone number for the originating phone number; and
establishing a phone call between the originating device and the end-user device by:
(i) transmitting from the aliasing server a request to establish a second telephone connection that is from the second alias phone number and addressed to the identified particular phone number;
(ii) when the first and second telephone connections are established, merging the first and second telephone connections to create the phone call.

11. The method of claim 10, further comprising:
analyzing, by the aliasing server before establishing the phone call, a whitelist to determine whether or not the originating phone number is in the whitelist;
wherein establishing the phone call between the originating device and the end-user device comprises establishing the phone call between the originating device and the end-user device only when the originating phone number is in the whitelist.

12. The method of claim 9, wherein the alias phone number is a first alias phone number and wherein the method further comprises:
receiving, at the aliasing server, a first text message including text message content, wherein the first text message is: (i) from an originating phone number and (ii) addressed to the first alias phone number;
analyzing the alias map to identify the particular phone number mapped to the first alias phone number;
generating a second alias phone number for the originating email address; and
generating and transmitting a second text message including the text message content such that the second text message is: (i) from the second alias phone number and (ii) addressed to the particular phone number.

13. The method of claim 12, further comprising:
analyzing, by the aliasing server before generating and transmitting the second text message, a whitelist to determine whether or not the originating phone number is in the whitelist;
wherein generating and transmitting the second text message comprises generating and transmitting the second text message only when the originating phone number is in the whitelist.

14. The method of claim 9, wherein the particular phone number is received in a first part of the message received from the end-user device by way of a data traffic route bypassing the resource server.

15. The method of claim 9, wherein generating and storing to the alias map an alias phone number comprises:
   storing the alias phone number such that it is mappable to only a single other phone number at any given time; and
   storing the particular phone number such that it is mappable to multiple alias phone number from the alias map.

16. The method of claim 9, wherein decoding the message comprises: decrypting a code in the message to identify the alias phone number.

17. The method of claim 16, wherein the resource server does not possess a key capable of decrypting the code.

18. An aliasing system for implementing alias phone numbers, the system comprising:
   a communication interface;
   one or more processors coupled to the communication interface;
   one or more memories coupled to the one or more processors, the one or more memories storing an alias map including one or more alias phone numbers for one or more user phone numbers;
   wherein the one or more memories further store computer readable instructions that, when executed by the one or more processors, cause the one or more processors to:
   (a) decode a message received via the communication interface from a resource server to identify: (i) a particular phone number assigned to an end-user device; (ii) an identifier for a service associated with the resource server; and (iii) a request for an alias for the particular phone number;
   (b) respond to the request by: generating and storing to the alias map an alias phone number such that the alias phone number is (i) unique relative to each of the other one or more alias phone numbers stored to the alias map; (ii) mapped, within the alias map, to both (A) the service associated with the resource server, and (B) the particular phone number; and (iii) functional as an address for the aliasing system so that emails addressed to the alias phone number are received at the aliasing system and forwarded to the particular phone number;
   (c) transmit, via the one or more communication interfaces, the alias phone number to the resource server for storage as a contact phone number for the user so that when the contact phone number is utilized, phone calls or text messages to the end-user device are enabled without storing the particular phone number at the resource server and without addressing the phone calls or text messages to the particular phone number.

19. The system of claim 18, wherein the alias phone number is a first alias phone number and wherein the instructions further cause the one or more processors to:
   receive, via the one or more communication interfaces, a first text message including text message content, wherein the first text message is: (i) from an originating phone number and (ii) addressed to the first alias phone number;
   analyze the alias map to identify the particular phone number mapped to the first alias phone number;
   generate a second alias phone number for the originating email address; and
   generate and transmit a second text message including the text message content such that the second text message is: (i) from the second alias phone number and (ii) addressed to the particular phone number.

20. The system of claim 19, wherein the instructions further cause the one or more processors to:
   analyze, by the one or more processors before generating and transmitting the second text message, a whitelist to determine whether or not the originating phone number is in the whitelist;
   wherein generating and transmitting the second text message comprises generating and transmitting the second text message only when the originating phone number is in the whitelist.

\* \* \* \* \*